US012561037B2

(12) United States Patent
Nakanishi

(10) Patent No.: US 12,561,037 B2
(45) Date of Patent: Feb. 24, 2026

(54) DETECTION DEVICE AND DETECTION SYSTEM

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/960,232

(22) Filed: Nov. 26, 2024

(65) Prior Publication Data

US 2025/0181197 A1      Jun. 5, 2025

(30) Foreign Application Priority Data

Dec. 1, 2023      (JP) ................................ 2023-204000

(51) Int. Cl.
        *G06F 3/044*          (2006.01)
        *G06F 3/041*          (2006.01)
(52) U.S. Cl.
        CPC ...... *G06F 3/0446* (2019.05); *G06F 3/041661* (2019.05); *G06F 3/0448* (2019.05); *G06F 2203/04101* (2013.01)

(58) Field of Classification Search
        CPC ............. G06F 3/041661; G06F 3/0446; G06F 3/0445; G06F 3/0448; G06F 3/04166; G06F 2203/04101; G06F 2203/04108
        See application file for complete search history.

(56) References Cited

U.S. PATENT DOCUMENTS

2013/0342498 A1      12/2013  Kim et al.
2014/0049486 A1       2/2014  Kim et al.
2014/0049508 A1       2/2014  Kim et al.
2019/0012013 A1*      1/2019  Teranishi .............. G06F 3/0412

* cited by examiner

*Primary Examiner* — Deeprose Subedi
(74) *Attorney, Agent, or Firm* — K&L Gates LLP

(57)      ABSTRACT

According to an aspect, a detection device includes: a detection region provided with a plurality of electrodes arrayed in a first direction and a second direction different from the first direction; a signal processor configured to generate a detection value for each of the electrodes; and a coordinate calculator configured to calculate data indicating a position of an object to be detected in the second direction on or above the detection region based on the detection values of the electrodes arrayed in the second direction. The shape of the electrodes is rectangular with a width in the second direction smaller than a width in the first direction.

6 Claims, 32 Drawing Sheets

FIG.3

DETECTION DEVICE AND DETECTION SYSTEM

CROSS-REFERENCE TO RELATED APPLICATION

This application claims the benefit of priority from Japanese Patent Application No. 2023-204000 filed on Dec. 1, 2023, the entire contents of which are incorporated herein by reference.

BACKGROUND

1. Technical Field

What is disclosed herein relates to a detection device and a detection system.

2. Description of the Related Art

In recent years, there has been known detection systems, what are called touch panels, in each of which a detection device capable of detecting an external proximity object is mounted on or integrated with a display device, such as a liquid crystal display device. In such detection systems, not only a touch detection function but also a hover detection function is attracting attention. The touch detection function is a function of detecting contact of an object to be detected, such as the operator's finger, with a detection surface. The hover detection function is a function of detecting the proximity state and a gesture or the like of the finger in the space on a detection region when the finger is not in contact with the detection surface.

In a configuration provided with a plurality of electrodes in the detection region and that detects capacitance generated in each electrode to detect the spatial coordinates of the position of the object to be detected on or above the detection region, it is necessary to increase the size of each electrode and enhance the sensitivity compared with a configuration that detects the plane coordinates of the touch detection position. In such a configuration, the spatial coordinates of the object to be detected on or above the detection region are calculated using detection values of the electrodes by center-of-gravity calculation, for example. However, if the size of the touch panel is small, for example, the number of electrodes provided on the detection region is reduced, whereby the accuracy in acquiring the proximity detection coordinates may possibly deteriorate.

For the foregoing reasons, there is a need for a detection device and a detection system that can improve the coordinate acquisition accuracy.

SUMMARY

According to an aspect, a detection device includes: a detection region provided with a plurality of electrodes arrayed in a first direction and a second direction different from the first direction; a signal processor configured to generate a detection value for each of the electrodes; and a coordinate calculator configured to calculate data indicating a position of an object to be detected in the second direction on or above the detection region based on the detection values of the electrodes arrayed in the second direction. The shape of the electrodes is rectangular with a width in the second direction smaller than a width in the first direction.

According to an aspect, a detection system includes: a detection device; and a display panel disposed facing a sensor substrate, which are provided with the electrodes, with an air gap interposed therebetween. The detection region and a display region of the display panel overlap in plan view when viewed in the third direction.

BRIEF DESCRIPTION OF THE DRAWINGS

FIG. 3 is a block diagram of an exemplary configuration of a detector of the detection device;

DETAILED DESCRIPTION

Figure 1:
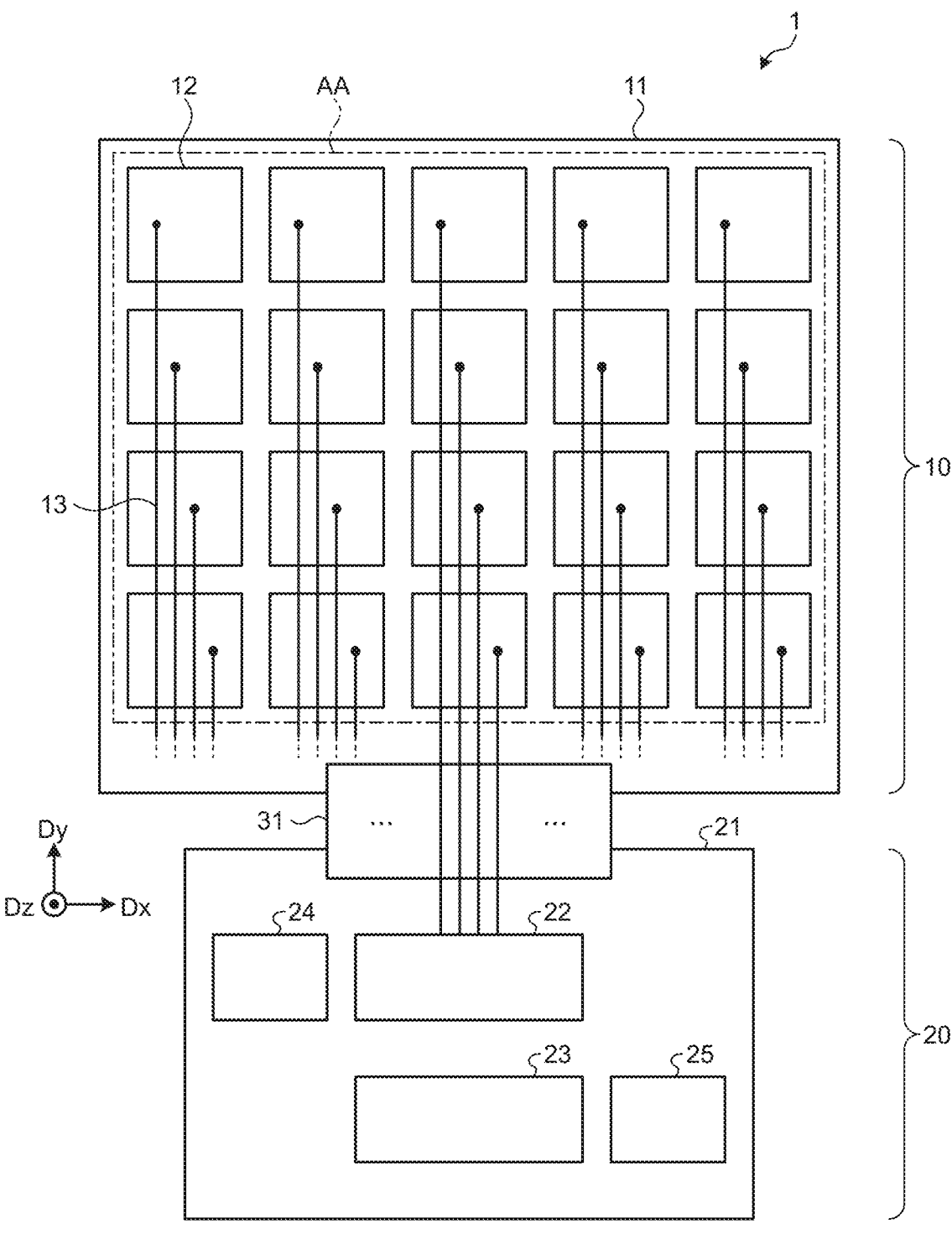
FIG. 1 is a plan view of a schematic configuration of a detection device used in a detection system according to the present disclosure.

Exemplary aspects (embodiments) to embody the present invention are described below in greater detail with reference to the accompanying drawings. The contents described in the embodiments below are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present invention. To make the explanation more specific, the drawings may possibly illustrate the width, the thickness, the shape, and other elements of each component more schematically than the actual aspect. These elements, however, are given by way of example only and are not intended to limit interpretation of the present invention. In the present specification and the drawings, components similar to those previously described with reference to previous drawings are denoted by the same reference numerals, and detailed explanation thereof may be omitted as appropriate.

FIG. 1 is a plan view of a schematic configuration of a detection device used in a detection system according to the present disclosure. As illustrated in FIG. 1, a detection device 1 includes a sensor 10 and a controller 20.

The sensor 10 includes a sensor substrate 11, a plurality of electrodes 12, and wiring lines 13. The electrodes 12 are provided in a detection region AA of the sensor substrate 11. The wiring lines 13 extend from the electrodes 12. The controller 20 includes a control substrate 21, a detection circuit 22, a processing circuit 23, a power supply circuit 24, and an interface circuit 25.

The detection region AA of the sensor substrate 11 is a region provided with the electrodes 12 arrayed in a matrix (row-column configuration) in a Dx direction and a Dy direction. FIG. 1 illustrates a configuration in which M (five in FIG. 1) electrodes 12 are arrayed in the Dx direction and N (four in FIG. 1) electrodes 12 are arrayed in the Dy direction. The sensor substrate 11 is a glass substrate or light-transmitting flexible printed circuits (FPC), for example.

In the present disclosure, the Dx direction and the Dy direction are orthogonal in the detection region AA of the sensor substrate 11. In the present disclosure, the direction orthogonal to the Dx direction and the Dy direction is referred to as a Dz direction.

While FIG. 1 illustrates an example where 5×4 (=20) electrodes 12 with five electrodes 12 in the Dx direction and four electrodes 12 in the Dy direction are provided, the number of electrodes 12 provided to the detection region AA of the sensor substrate 11 is not limited thereto.

The sensor substrate 11 is electrically coupled to the control substrate 21 via a wiring substrate 31. The wiring substrate 31 is flexible printed circuits, for example. Each electrode 12 of the sensor 10 is coupled to the detection circuit 22 of the controller 20 via a wiring substrate 31.

The control substrate 21 is provided with the detection circuit 22, the processing circuit 23, the power supply circuit 24, and the interface circuit 25. The control substrate 21 is a rigid board, for example.

The detection circuit 22 generates a detection value of each electrode 12 based on detection signals of the electrode 12 output from the sensor substrate 11. The detection circuit 22 is an analog front-end (AFE) IC, for example.

The processing circuit 23 generates the spatial coordinates indicating the position of an object to be detected (e.g., operator's finger) on or above the detection region AA based on the detection values of the electrodes 12 that are output from the detection circuit 22. The processing circuit 23 may be a programmable logic device (PLD), such as a field programmable gate array (FPGA), or a micro control unit (MCU), for example.

The power supply circuit 24 is a circuit that supplies power to the detection circuit 22 and the processing circuit 23.

The interface circuit 25 is a USB controller IC, for example, and is a circuit that controls communications between the processing circuit 23 and a host controller (not illustrated) of a host device on which the detection system is mounted.

Figure 2:
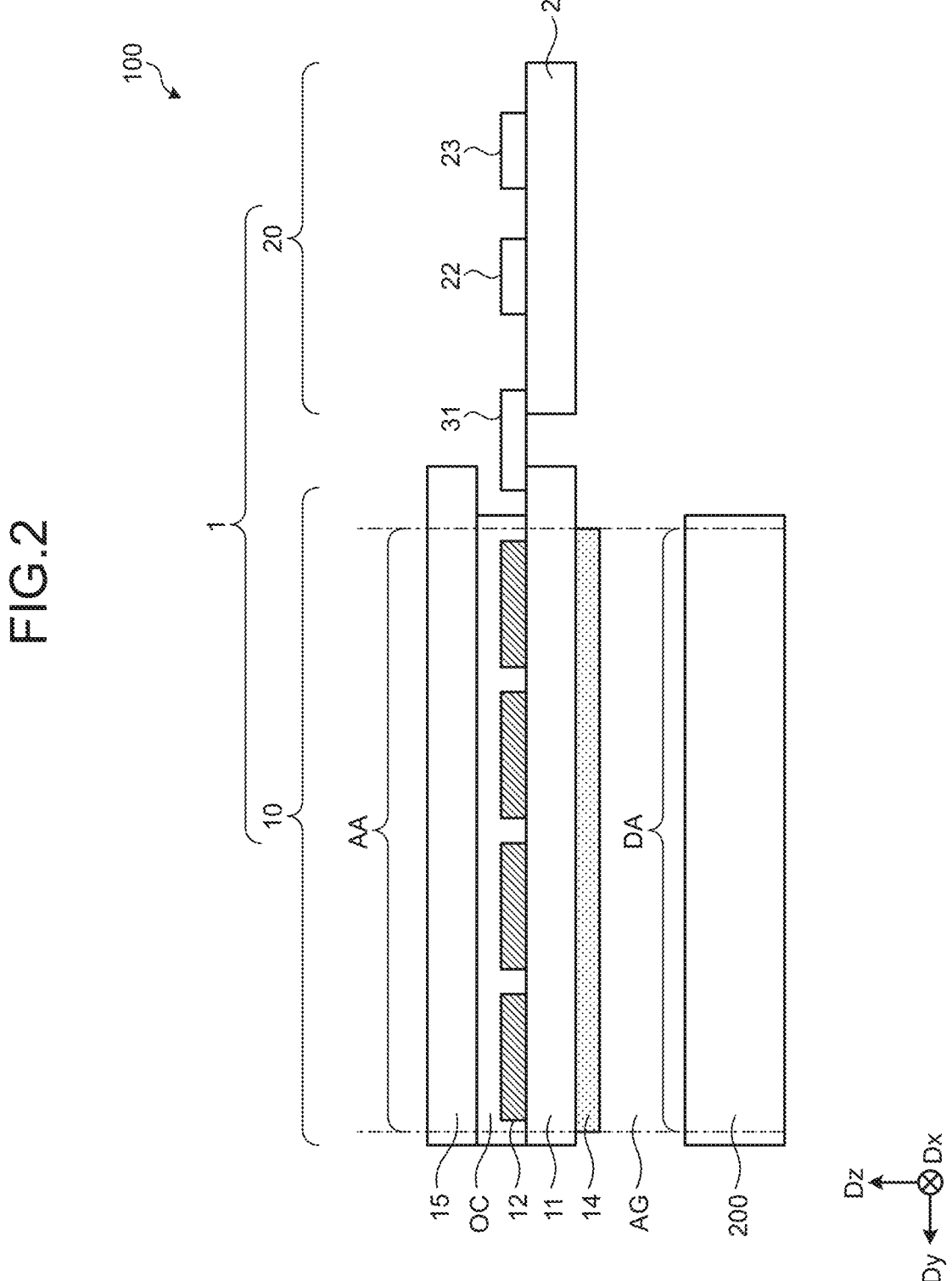
FIG. 2 is a schematic of a sectional configuration of the detection system.

FIG. 2 is a schematic of a sectional configuration of the detection system.

A detection system 100 according to the first embodiment includes the detection device 1 and a display panel 200. The display panel 200 is disposed facing the sensor 10 of the detection device 1 with an air gap AG interposed therebetween. The sensor 10 of the detection device 1 is disposed such that the detection region AA of the sensor 10 and a display region DA of the display panel 200 overlap in plan view when viewed in the Dz direction. The display panel 200 is a liquid crystal display (LCD), for example. The display panel 200 may be an organic light-emitting diode (OLED) display or an inorganic EL display (micro-LED or mini-LED), for example.

The sensor 10 includes the sensor substrate 11, the electrodes 12, a shield 14, and a cover glass 15. In the sensor 10, the shield 14, the sensor substrate 11, the electrodes 12, and the cover glass 15 are stacked in order on the display panel 200. In the following description, the surface of the cover glass 15 provided as the top layer is also referred to as "detection surface".

The shield 14 is provided to a first surface of the sensor substrate 11 facing the display panel 200. The electrodes 12 are provided on a second surface opposite to the first surface of the sensor substrate 11. The cover glass 15 is provided on the second surface of the sensor substrate 11 with an adhesive layer OC interposed therebetween. The adhesive layer OC is preferably a light-transmitting adhesive. The adhesive layer OC may be formed by a light-transmitting double-sided adhesive film, such as an optical clear adhesive (OCA).

Figure 3:
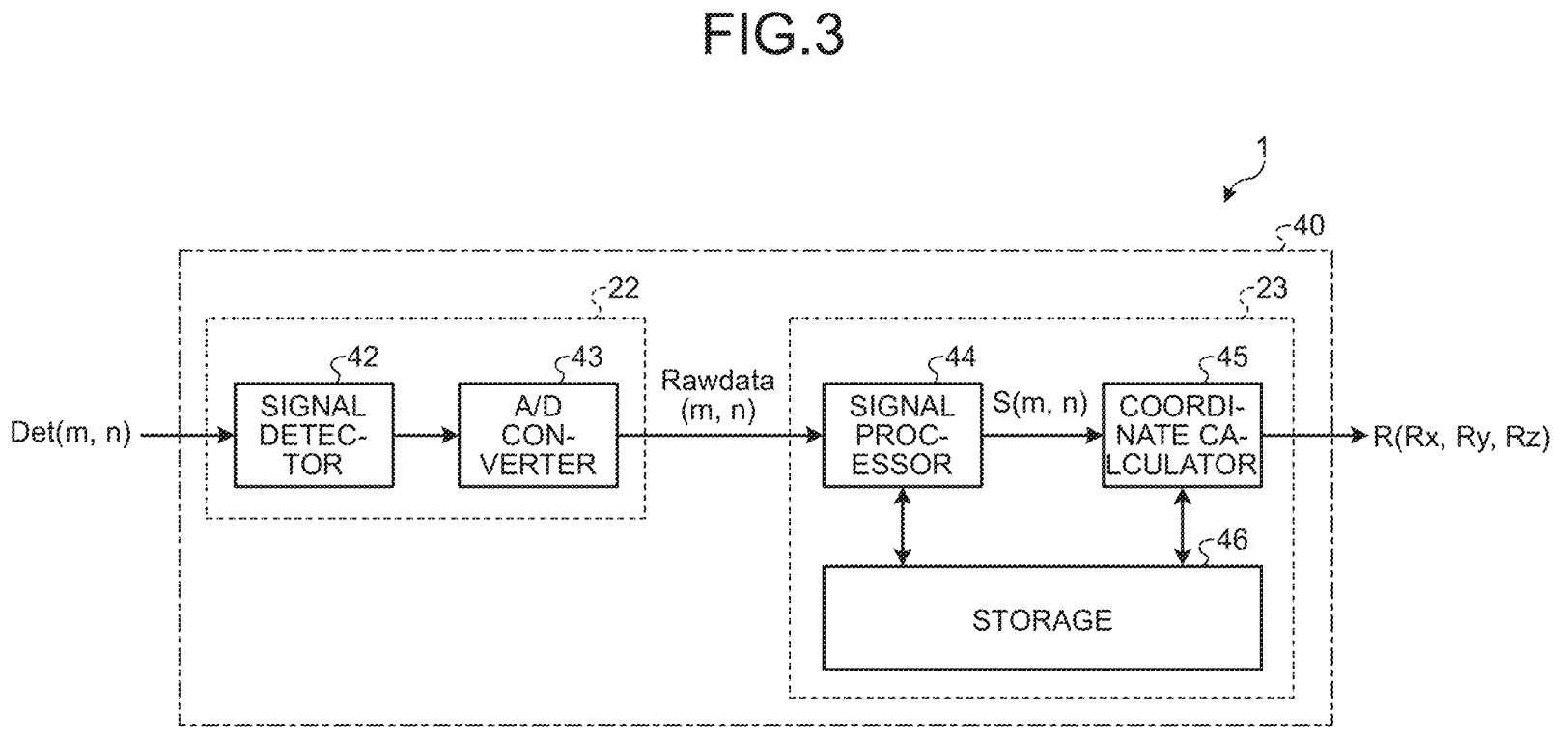

FIG. 3 is a block diagram of an exemplary configuration of a detector of the detection device.

As illustrated in FIG. 3, a detector 40 includes a signal detector 42, an analog-to-digital converter (A/D converter) 43, a signal processor 44, a coordinate calculator 45, and a storage 46. The signal detector 42 and the A/D converter 43 are included in the detection circuit 22. The signal processor 44, the coordinate calculator 45, and the storage 46 are included in the processing circuit 23.

The signal detector 42 generates an output value Rawdata (m, n) of each electrode 12 based on a detection signal Det(m, n) of the electrode 12 output from the sensor substrate 11 (m is a natural number from 1 to M, where M is the number of electrodes arrayed in the Dx direction in the detection region AA, and n is a natural number from 1 to N, where N is the number of electrodes arrayed in the Dy direction in the detection region AA). The A/D converter 43 converts the output value of each electrode 12 into a digital signal by sampling the output value. In the present disclosure, Rawdata(m, n) represents the output value of the electrode 12 in the m-th column and the n-th row.

The signal processor 44 performs linear transformation on the output value Rawdata(m, n) of each electrode 12 and outputs the value resulting from the transformation as a detection value S(m, n) of the electrode 12. In the present disclosure, S(m, n) represents the detection value of the electrode 12 in the m-th column and the n-th row.

The coordinate calculator 45 extracts the spatial coordinates of the position of the object to be detected, based on the detection value S(m, n) of each electrode 12.

The storage 46 stores therein various parameters, tables, and the like used in the processing performed by the signal processor 44 and the coordinate calculator 45. The storage 46 also has a function of storing therein intermediate data or the like in the processing performed by the coordinate calculator 45.

Figure 4A:
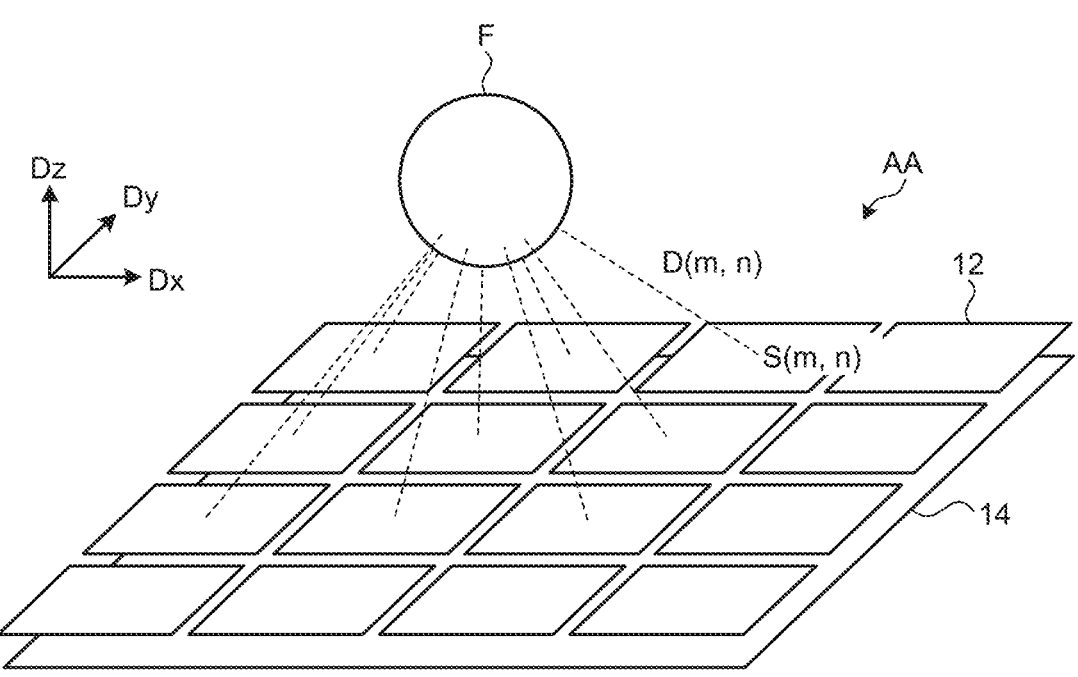
FIG. 4A is a schematic of the relation between the position of an object to be detected in a space on a detection region and the positions of respective electrodes.
Figure 4B:
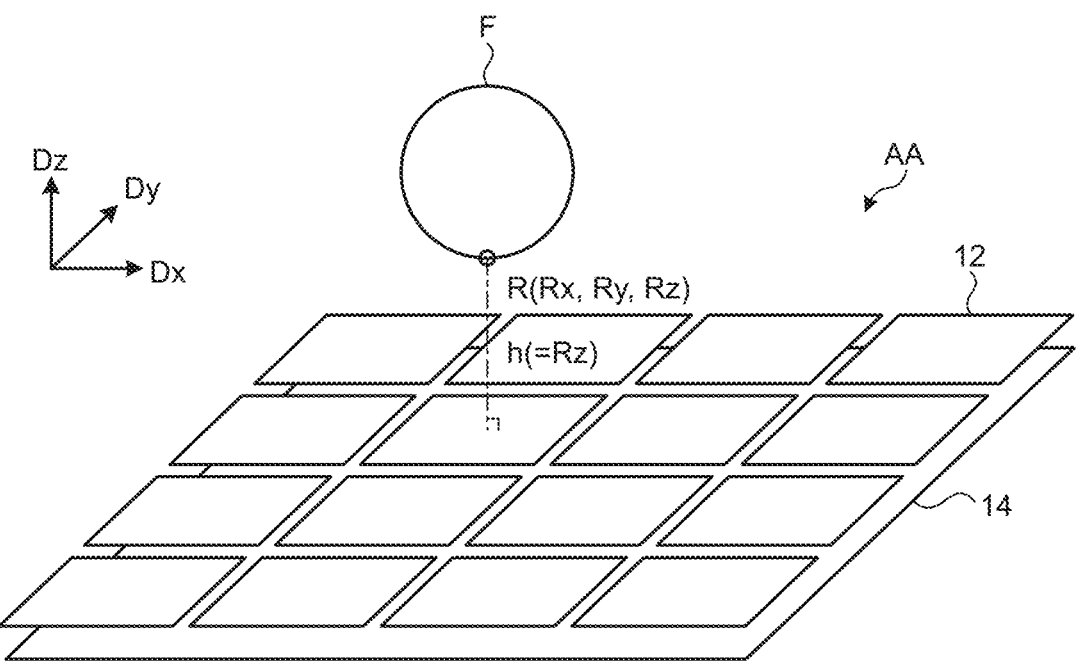
FIG. 4B is a schematic of the spatial coordinates of the object to be detected in the space on the detection region.

FIG. 4A is a schematic of the relation between the position of the object to be detected in a space on the detection region and the positions of the respective electrodes. FIG. 4B is a schematic of the spatial coordinates of the object to be detected in the space on the detection region. FIGS. 4A and 4B illustrate an example where an object to be detected F is in the space on the detection region AA.

Each electrode 12 in the detection region AA generates capacitance corresponding to a distance D(m, n) between the object to be detected F in the space on the detection region AA and the electrode 12, and the output value Rawdata(m, n) corresponding to the capacitance is acquired by the detection circuit 22. The Rawdata(m, n) acquired by the detection circuit 22 is subjected to linear transformation by the signal processor 44. Thus, the detection value S(m, n) of each electrode 12 is generated as illustrated in FIG. 4A.

The coordinate calculator 45 calculates the spatial coordinates R(Rx, Ry, Rz) indicating the position of the object to be detected F in the space on the detection region AA illustrated in FIG. 4B based on the detection values S(m, n) of the electrodes 12 generated by the signal processor 44.

In the present disclosure, the spatial coordinates R(Rx, Ry, Rz) include data Rx indicating the position in the Dx direction in the detection region AA, data Ry indicating the position in the Dy direction in the detection region AA, and data Rz indicating the position in the Dz direction orthogonal to the Dx direction and the Dy direction.

In the present disclosure, the surface of the cover glass 15 is assumed to be the detection surface, and the spatial coordinates R(Rx, Ry, Rz) indicate the position of the object to be detected F in the space on the detection surface.

As described above, the detection device 1 according to the present disclosure is configured to detect the spatial coordinates of the position of the object to be detected F on or above the detection region AA by detecting the capacitance generated on the electrodes 12. To detect the object to be detected F at a position away from the detection region AA in the Dz direction, it is necessary to enhance the sensitivity by increasing the size of each electrode 12 compared with a configuration that detects the plane coordinates of the contact position of the object to be detected F with the detection surface. Typically, the size of each electrode 12 is preferably approximately 20 mm×20 mm to 40 mm×40 mm, for example, and is specifically approximately 30 mm×30 mm.

Figure 5A:
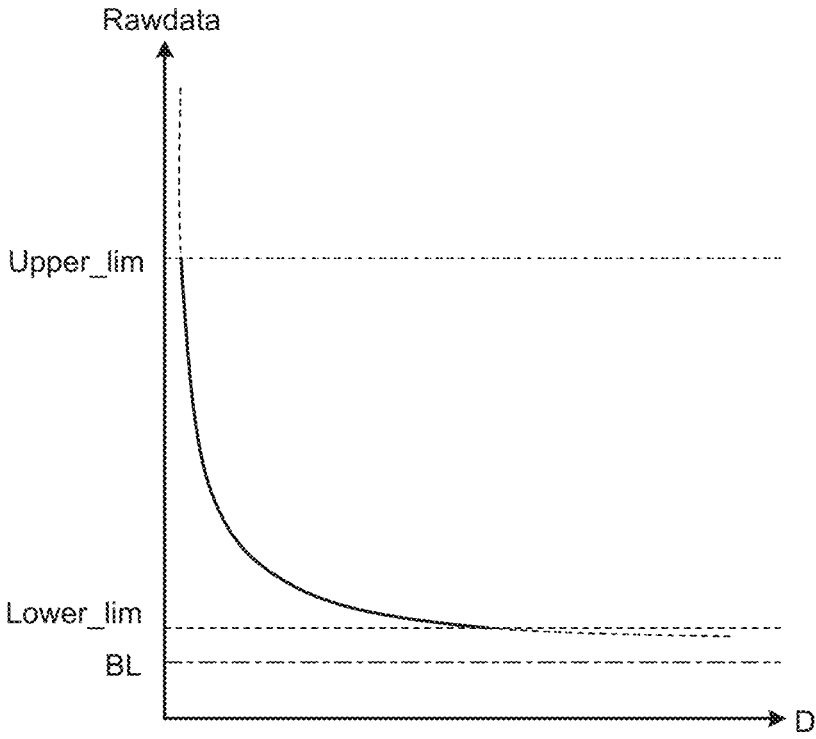
FIG. 5A is a graph of a first example of the relation between the distance between the object to be detected and the electrode and the output value.
Figure 5B:
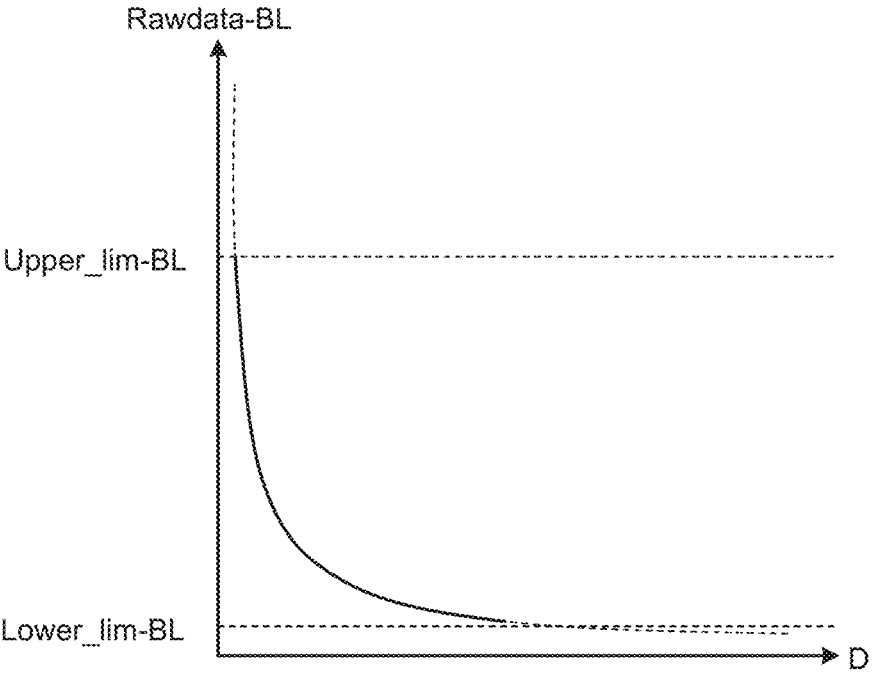
FIG. 5B is a graph of a second example of the relation between the distance between the object to be detected and the electrode and the output value.

FIG. 5A is a graph of a first example of the relation between the distance between the object to be detected and the electrode and the output value. FIG. 5B is a graph of a second example of the relation between the distance between the object to be detected and the electrode and the output value. In FIG. 5A, the horizontal axis indicates the distance D between the object to be detected F and the electrode 12, and the vertical axis indicates the output value Rawdata. In FIG. 5A, BL in the vertical axis direction indicates the output value when the distance D between the object to be detected F and the electrode 12 is infinite. The vertical axis in FIG. 5B indicates the difference Rawdata-BL between the output value Rawdata and BL.

As illustrated in FIG. 5A, the reduction ratio of the output value Rawdata decreases as the distance D between the object to be detected F and the electrode 12 increases. In other words, the change ratio of the output value Rawdata decreases as the distance D between the object to be detected F and the electrode 12 increases. Therefore, the accuracy in detecting the distance D between the object to be detected F and the electrode 12 decreases in a region where the output value Rawdata is equal to or smaller than a certain value. Specifically, in the region below the lower limit Lower_lim illustrated in FIG. 5A, the accuracy in detecting the distance D between the object to be detected F and the electrode 12 fails to be maintained.

As illustrated in FIG. 5A, the increase ratio of the output value Rawdata exponentially increases as the distance D between the object to be detected F and the electrode 12 decreases. In other words, the change ratio of the output value Rawdata sharply increases as the distance D between the object to be detected F and the electrode 12 decreases. Therefore, the accuracy in detecting the distance D between the object to be detected F and the electrode 12 decreases in a region where the output value Rawdata is equal to or larger than a certain value. In particular, the size of each electrode 12 is large in the detection device 1 according to the present disclosure. Therefore, when the object to be detected F is present at a position in proximity to or in contact with the detection surface, the change in the output value Rawdata is large with respect to the change in the distance D between the object to be detected F and the electrode 12. Specifically, in the region above the upper limit Upper_lim illustrated in FIG. 5A, the accuracy in detecting the distance D between the object to be detected F and the electrode 12 fails to be maintained.

For this reason, the output value Rawdata according to the present disclosure is linearly transformed in the range greater than or equal to the lower limit Lower_lim but not greater than the upper limit Upper_lim illustrated in FIG. 5A. Specifically, the signal processor 44 calculates the difference Rawdata-BL between the output value Rawdata and BL illustrated in FIG. 5A (refer to FIG. 5B) and performs linear transformation on the difference Rawdata-BL.

Figure 6:
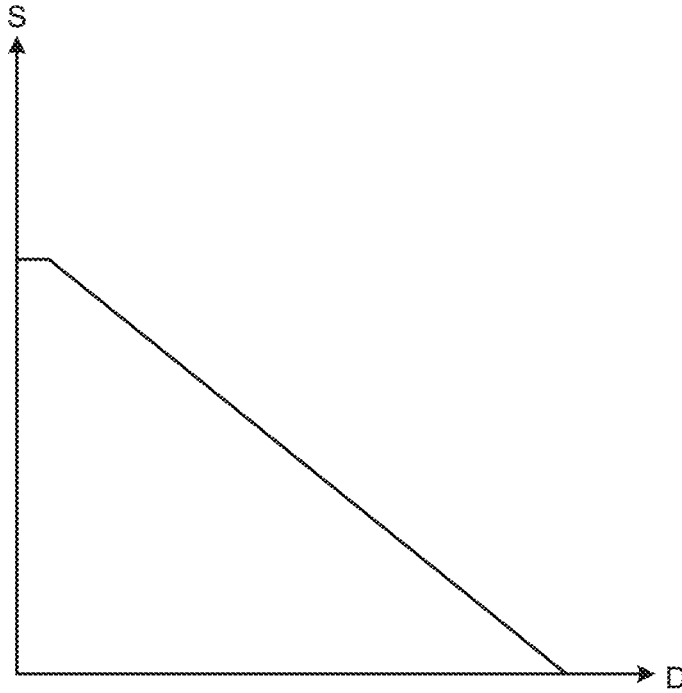
FIG. 6 is a graph of the relation between the detection value after linear transformation and the distance between the object to be detected and the electrode.

FIG. 6 is a graph of the relation between the detection value after linear transformation and the distance between the object to be detected and the electrode. In FIG. 6, the horizontal axis indicates the distance D between the object to be detected F and the electrode 12, and the vertical axis indicates the detection value S after linear transformation.

The signal processor 44 derives the detection value S of each electrode 12 using a table indicating the correspondence between the difference Rawdata-BL illustrated in FIG. 5B and the detection value S illustrated in FIG. 6. The table indicating the correspondence between the difference Rawdata-BL and the detection value S may be, for example, in a form where the detection value S is set corresponding to the difference Rawdata-BL or in a form where a relational expression between the difference Rawdata-BL and the detection value S is set. The table indicating the correspondence between the difference Rawdata-BL and the detection value S is stored in the storage 46 provided in the processing circuit 23, for example.

The following describes a specific example of the coordinate calculation according to the embodiment. Before describing the coordinate calculation according to the embodiment, the coordinate calculation according to a comparison example is described.

FIGS. 7A, 7B, 7C, and 7D are schematics for explaining the procedure of the coordinate calculation according to the comparative example. FIG. 8 is a flowchart of a specific example of the coordinate calculation according to the comparative example.

Figure 7A:
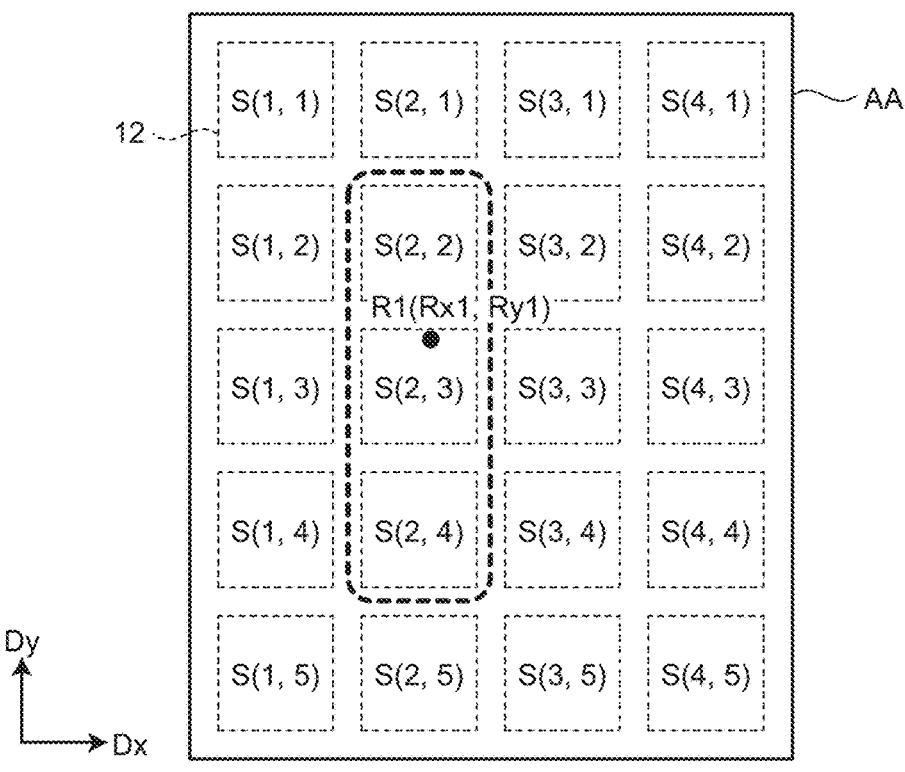
FIG. 7A is a schematic for explaining the procedure of coordinate calculation according to a comparative example.
Figure 7B:
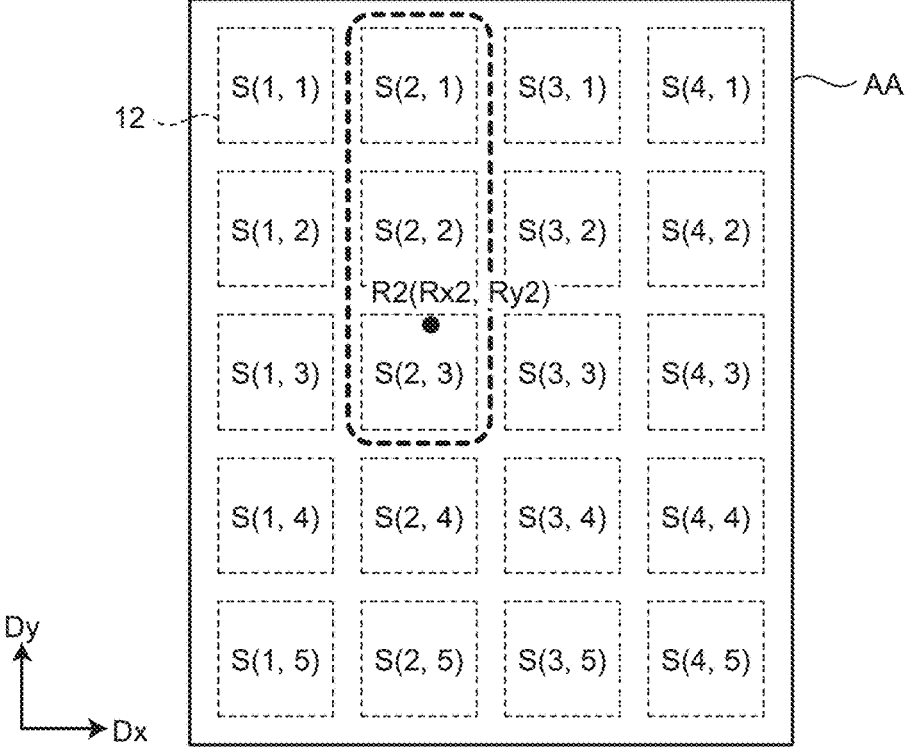
FIG. 7B is a schematic for explaining the procedure of the coordinate calculation according to the comparative example.
Figure 7C:
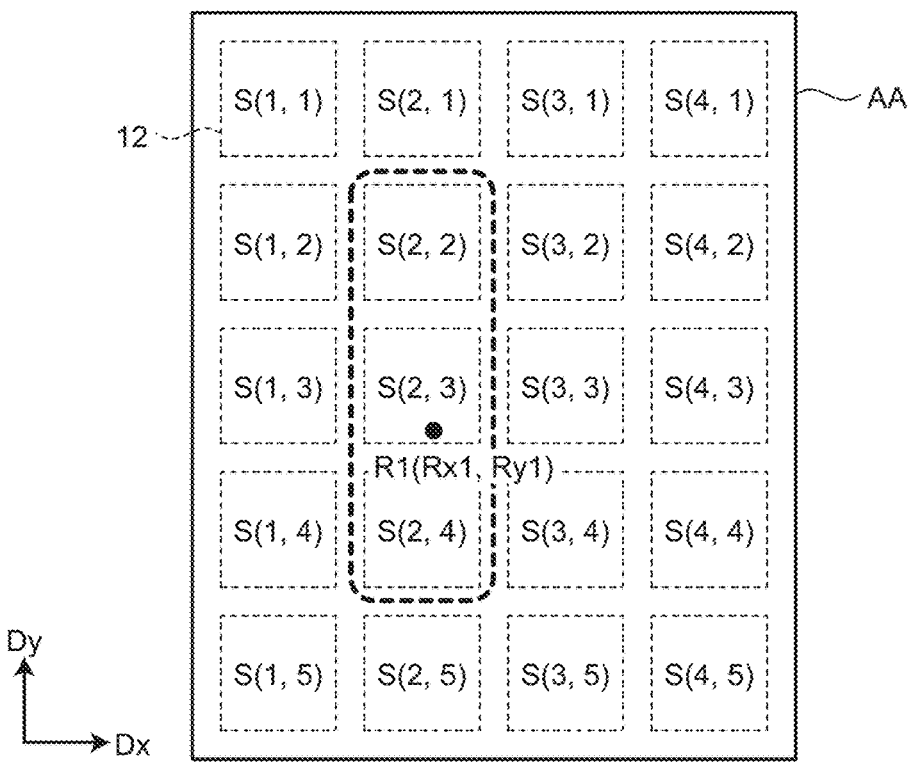
FIG. 7C is a schematic for explaining the procedure of the coordinate calculation according to the comparative example.
Figure 7D:
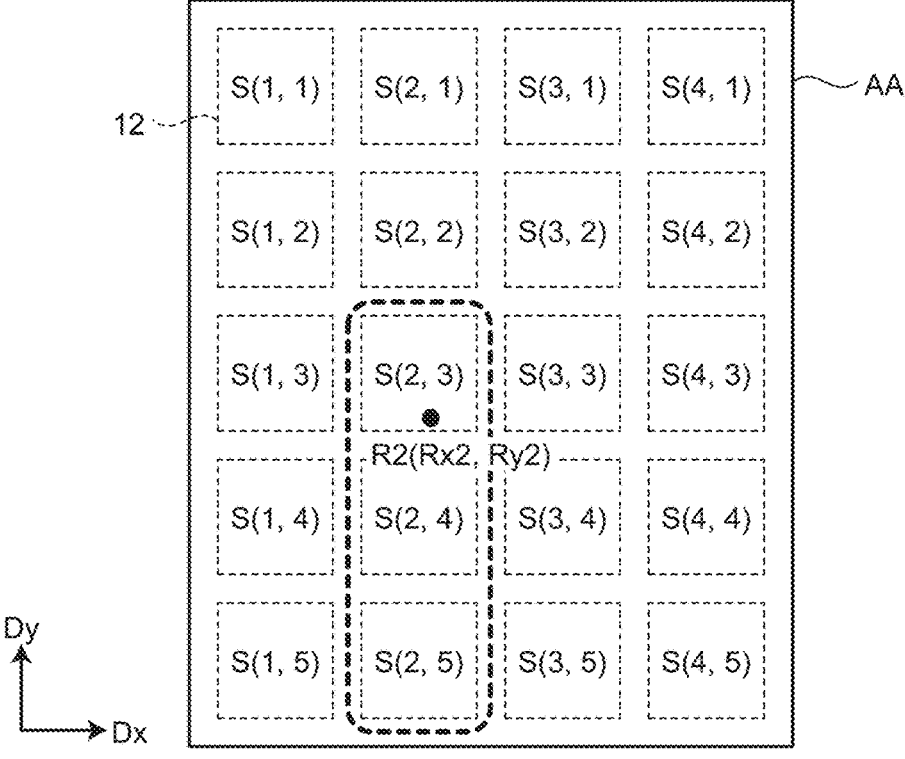
FIG. 7D is a schematic for explaining the procedure of the coordinate calculation according to the comparative example.
Figure 8:
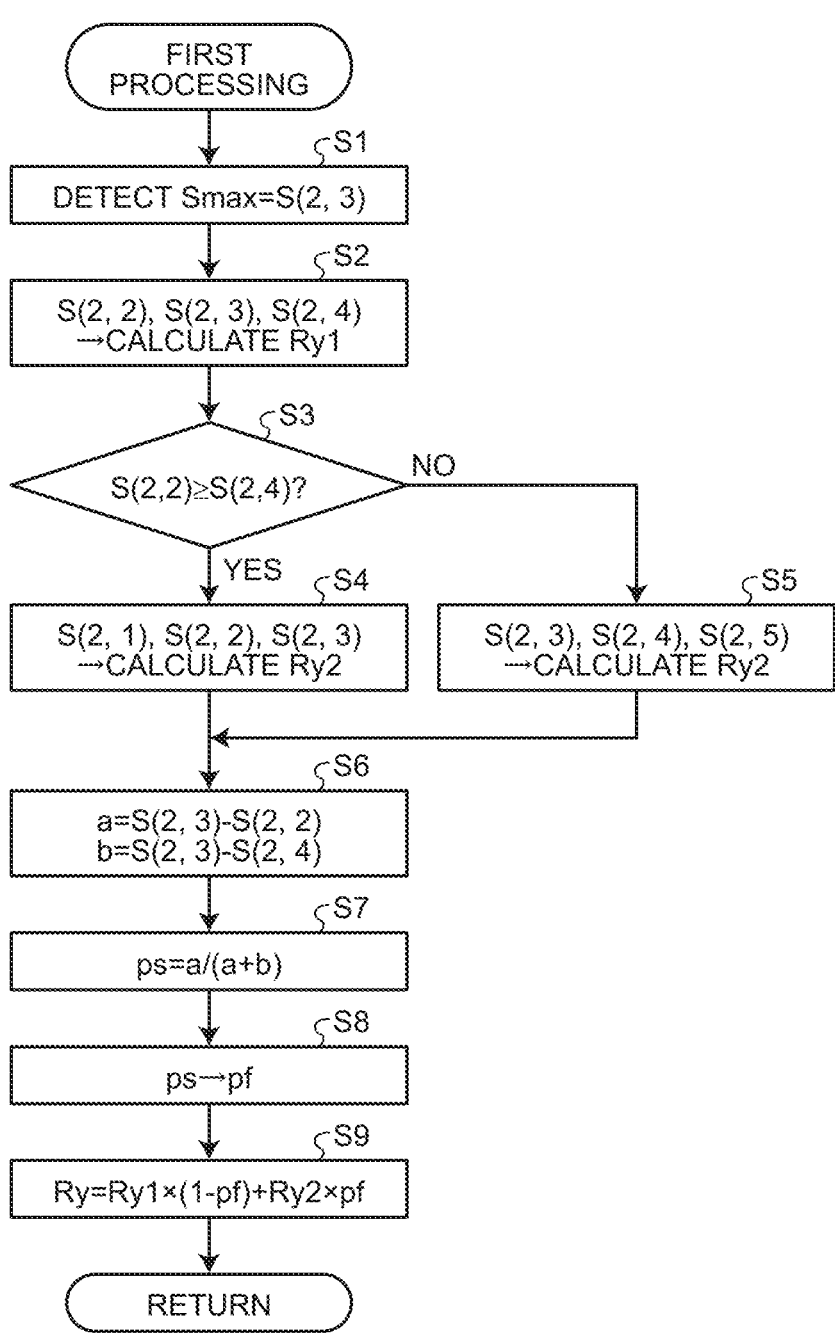
FIG. 8 is a flowchart of a specific example of the coordinate calculation according to the comparative example.

FIGS. 7A, 7B, 7C, and 7D illustrate a configuration in which 4×5 (=20) electrodes 12 are arrayed on the detection region AA. The black dots illustrated in FIGS. 7A, 7B, 7C, and 7D indicate the most proximal position of the object to be detected F on or above the detection region AA. In FIGS. 7A and 7B, the object to be detected F is in the most proximity to an upper position on the electrode 12 in the second column and the third row. In FIGS. 7C and 7D, the object to be detected F is in the most proximity to a lower position on the electrode 12 in the second column and the third row.

FIG. 8 illustrates an example of calculating the data Ry out of the spatial coordinates R(Rx, Ry, Rz) of the object to be detected F. The data Ry is calculated using the detection values of three electrodes 12 arrayed in the Dy direction and including the electrode 12 the detection value S(m, n) of which is the largest, by a known center-of-gravity calculation method, for example.

In the coordinate calculation according to the comparative example, the coordinate calculator 45 extracts the electrode 12 the detection value S(m, n) of which is the largest and detects the detection value S(m, n) of the extracted electrode 12 as the maximum detection value Smax (Step S1). In this example, the detection value S(2, 3) of the electrode 12 in the second column and the third row is detected as the maximum detection value Smax.

The coordinate calculator 45 calculates first data Ry1 using the detection value S(2, 2) of the electrode 12 in the second column and the second row, the detection value S(2, 3) of the electrode 12 in the second column and the third row, and the detection value S(2, 4) of the electrode 12 in the second column and the fourth row (Step S2).

Subsequently, the coordinate calculator 45 determines whether the detection value S(2, 2) of the electrode 12 in the second column and the second row is equal to or larger than the detection value S(2, 4) of the electrode 12 in the second column and the fourth row (Step S3).

As illustrated in FIG. 7A, when the object to be detected F is in the most proximity to the upper position on the electrode 12 in the second column and the third row, the detection value S(2, 2) of the electrode 12 in the second column and the second row is equal to or larger than the detection value S(2, 4) of the electrode 12 in the second column and the fourth row (Yes at Step S3). In this case, as illustrated in FIG. 7B, second data Ry2 is calculated using the detection value S(2, 1) of the electrode 12 in the second column and the first row, the detection value S(2, 2) of the electrode 12 in the second column and the second row, and the detection value S(2, 3) of the electrode 12 in the second column and the third row (Step S4).

By contrast, as illustrated in FIG. 7C, when the object to be detected F is in the most proximity to the lower position on the electrode 12 in the second column and the third row, the detection value S(2, 2) of the electrode 12 in the second column and the second row is smaller than the detection value S(2, 4) of the electrode 12 in the second column and the fourth row (No at Step S3). In this case, as illustrated in FIG. 7D, the second data Ry2 is calculated using the detection value S(2, 3) of the electrode 12 in the second column and the third row, the detection value S(2, 4) of the electrode 12 in the second column and the fourth row, and the detection value S(2, 5) of the electrode 12 in the second column and the fifth row (Step S5).

Figure 9:
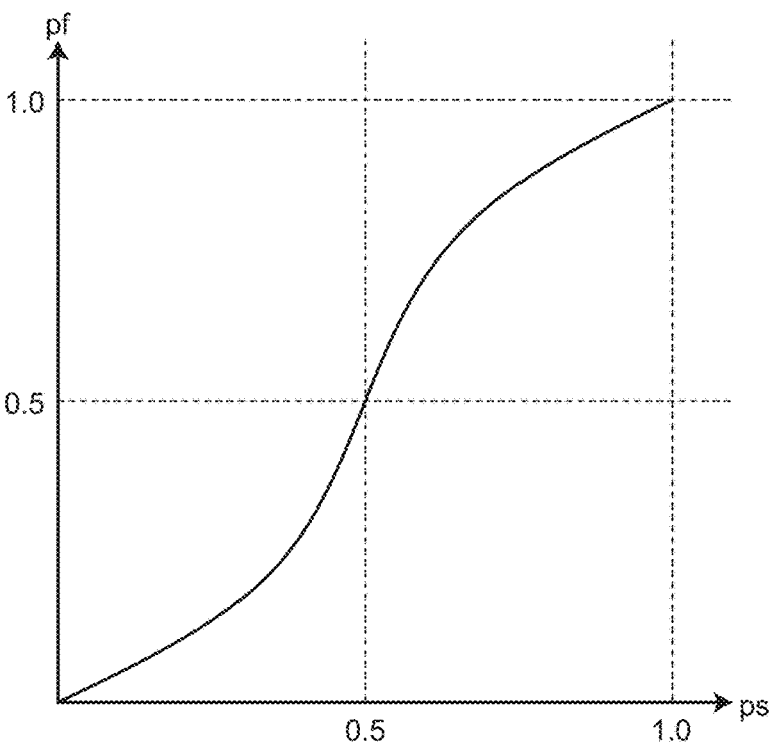
FIG. 9 is a graph illustrating an example of a data composition ratio table.

The coordinate calculator 45 calculates the difference "a" between the detection value S(2, 3) of the electrode 12 in the second column and the third row and the detection value S(2, 2) of the electrode 12 in the second column and the second row and calculates the difference "b" between the detection value S(2, 3) of the electrode 12 in the second column and the third row and the detection value S(2, 4) of the electrode 12 in the second column and the fourth row (Step S6). Subsequently, the coordinate calculator 45 calculates a detection value ratio ps using the following Expression (1) (Step S7) and derives a composition ratio pf using a data composition ratio table illustrated in FIG. 9 (Step S8). FIG. 9 is a graph illustrating an example of the data composition ratio table.

$$ps = a/(a + b) \qquad (1)$$

The data composition ratio table illustrated in FIG. 9 may be, for example, in a form where the composition ratio pf is set corresponding to the detection value ratio ps or in a form where a relational expression between the detection value ratio ps and the composition ratio pf is set. The data composition ratio table is stored in the storage 46 provided in the processing circuit 23, for example.

Subsequently, the coordinate calculator 45 calculates the data Ry indicating the position of the object to be detected F in the Dy direction on or above the detection region AA using the following Expression (2) (Step S9).

$$Ry = Ry1 \times (1 - pf) + Ry2 \times pf \qquad (2)$$

As illustrated in FIGS. 7A and 7B, when the object to be detected F is in the most proximity to the upper position on the electrode 12 in the second column and the third column, the detection value S(2, 2) of the electrode 12 in the second column and the second row is larger than the detection value S(2, 4) of the electrode 12 in the second column and the fourth row. As a result, the difference "a" between the detection value S(2, 3) of the electrode 12 in the second column and the third row and the detection value S(2, 2) of the electrode 12 in the second column and the second row is smaller than the difference "b" between the detection value S(2, 3) of the electrode 12 in the second column and the third row and the detection value S(2, 4) of the electrode 12 in the second column and the fourth row. Therefore, the ratio of the first data Ry1 to the data Ry is larger than that of the second data Ry2 by the processing from Step S7 to Step S9 using Expression (1) above, the data composition ratio table illustrated in FIG. 9, and Expression (2) above.

By contrast, as illustrated in FIGS. 7C and 7D, when the object to be detected F is in the most proximity to the lower position on the electrode 12 in the second column and the third row, the detection value S(2, 2) of the electrode 12 in the second column and the second row is smaller than the detection value S(2, 4) of the electrode 12 in the second column and the fourth row. As a result, the difference "a" between the detection value S(2, 3) of the electrode 12 in the second column and the third row and the detection value S(2, 2) of the electrode 12 in the second column and the second row is larger than the difference "b" between the detection value S(2, 3) of the electrode 12 in the second column and the third row and the detection value S(2, 4) of the electrode 12 in the second column and the fourth row.

Therefore, the ratio of the first data Ry1 to the data Ry is smaller than that of the second data Ry2 by the processing from Step S7 to Step S9 using Expression (1) above, the data composition ratio table illustrated in FIG. 9, and Expression (2) above.

Thus, the first data Ry1 and the second data Ry2 corresponding to the position on the electrode to which the object to be detected F is in the most proximity are acquired by using the detection values of a plurality of electrodes 12, and the first data Ry1 and the second data Ry2 are combined in a ratio corresponding to the position on the electrode to which the object to be detected F is in the most proximity. With this operation, the coordinate acquisition accuracy can be enhanced.

Figure 10:
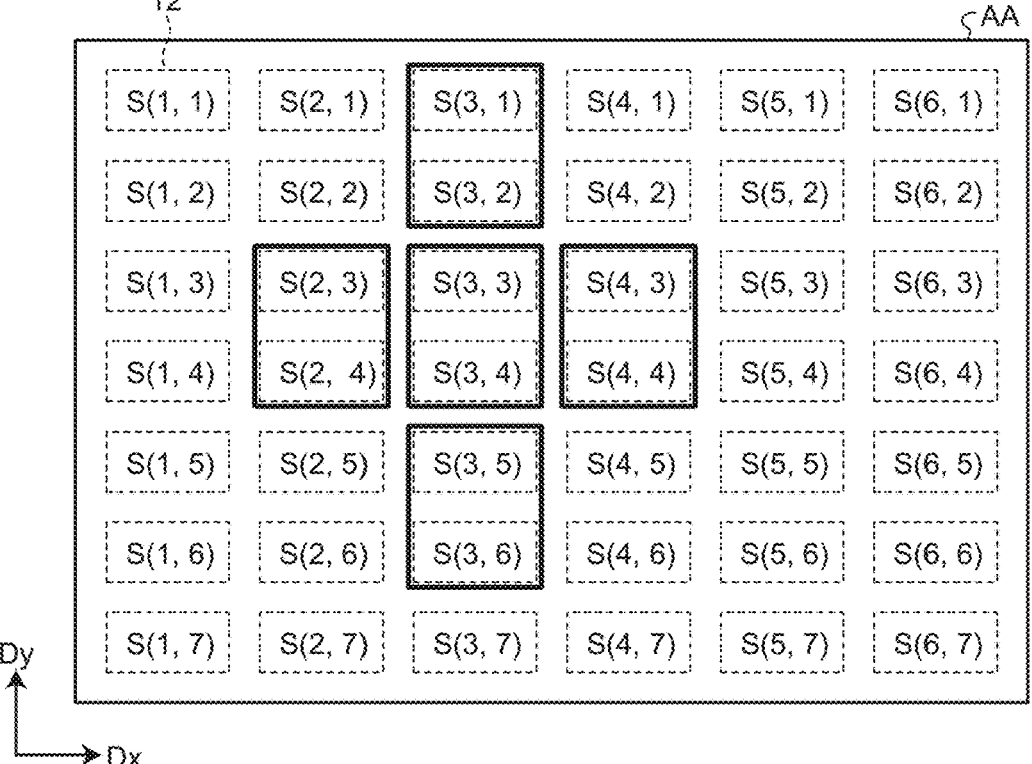
FIG. 10 is a first diagram of the detection region of the detection device according to an embodiment.
Figure 11:
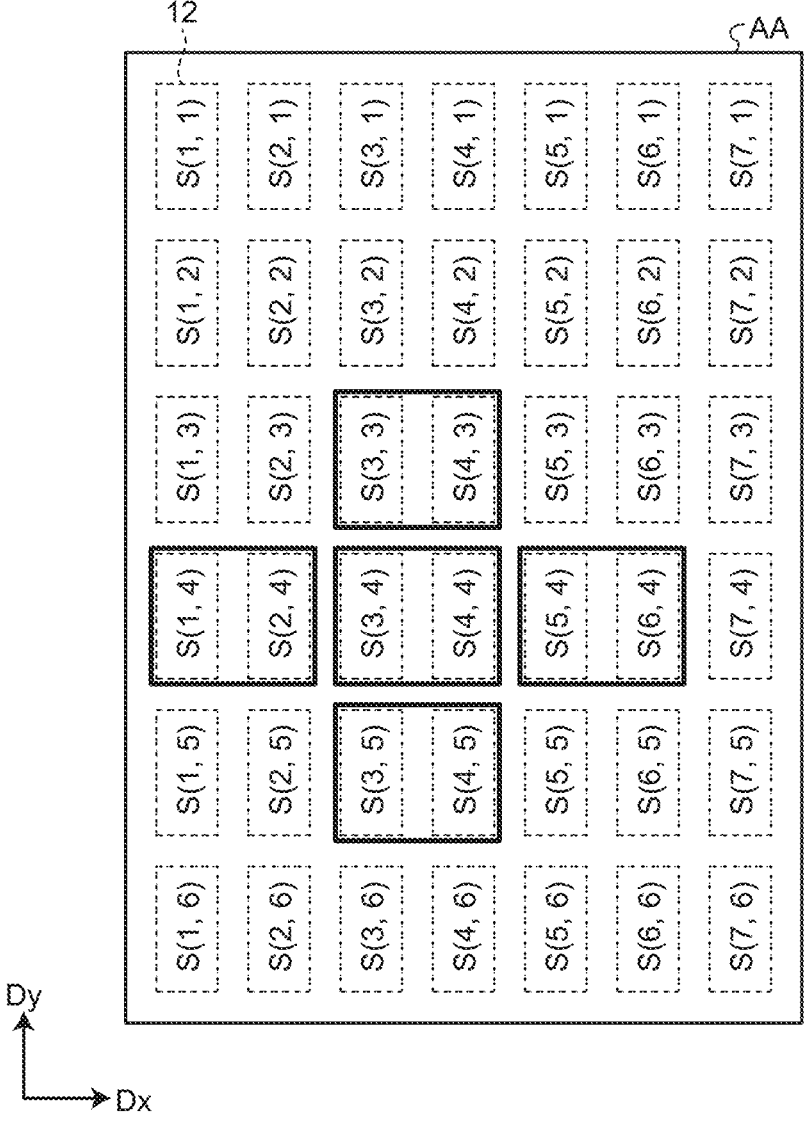
FIG. 11 is a second diagram of the detection region of the detection device according to the embodiment.

FIG. 10 is a first diagram of the detection region of the detection device according to the embodiment. FIG. 11 is a second diagram of the detection region of the detection device according to the embodiment.

FIG. 10 illustrates an aspect where the detection region AA is a horizontally elongated region with the width in the Dx direction larger than the width in the Dy direction. In the aspect illustrated in FIG. 10, the Dx direction corresponds to a "first direction". In the aspect illustrated in FIG. 10, the Dy direction corresponds to a "second direction".

FIG. 11 illustrates an aspect where the detection region AA is a vertically elongated region with the width in the Dx direction smaller than the width in the Dy direction. In the aspect illustrated in FIG. 11, the Dx direction corresponds to the "second direction". In the aspect illustrated in FIG. 11, the Dy direction corresponds to the "first direction".

In the aspect illustrated in FIG. 10, the shape of each electrode 12 is rectangular with the width in the Dy direction (second direction) smaller than the width in the Dx direction (first direction). The width of each electrode 12 in the Dx direction (first direction) is approximately 30 mm, for example, whereas the width in the Dy direction (second direction) is approximately 30% to 70% of the width in the Dx direction (first direction). More specifically, the width in the Dy direction (second direction) is approximately 9 mm to 21 mm. The shape of each electrode 12 is not limited to a rectangle and may be a rounded rectangle, for example.

By contrast, in the aspect illustrated in FIG. 11, the shape of each electrode 12 is rectangular with the width in the Dx direction (second direction) smaller than the width in the Dy direction (first direction). The width of each electrode 12 in the Dy direction (first direction) is approximately 30 mm, for example, whereas the width in the Dx direction (second direction) is approximately 30% to 70% of the width in the Dy direction (first direction). More specifically, the width in the Dx direction (second direction) is approximately 9 mm to 21 mm. The shape of each electrode 12 is not limited to a rectangle and may be a rounded rectangle, for example.

In these aspects, when the distance D between the object to be detected F and the electrode 12 is relatively large, a plurality of electrodes 12 arrayed in the short side direction (second direction, which is the Dy direction in FIG. 10 and the Dx direction in FIG. 11) are grouped together into one electrode group, and the coordinate calculation is performed using a composite detection value obtained by compositing the detection values S(m, n) of the electrodes 12 included in the electrode group. The composite detection value according to the present disclosure is obtained by digitally adding the detection values of the electrodes 12, for example.

More specifically, in a region where the maximum detection value Smax is relatively small, for example, the coordinate calculation is performed using the detection values of a plurality of (e.g., three) electrodes including the electrode 12 the detection value S(m, n) of which is the maximum detection value Smax in the same manner as in the coordinate calculation according to the comparative example described above. This can enhance the accuracy in acquiring the coordinates of the object to be detected F at a relatively close position.

By contrast, in a region where the maximum detection value Smax is relatively large, for example, a plurality of (two in FIGS. 10 and 11) electrodes 12 arrayed in the short side direction (second direction, which is the Dy direction in FIG. 10 and the Dx direction in FIG. 11) are grouped together into one electrode group, the composite detection value is calculated by compositing the detection values S(m, n) of the electrodes 12 included in the electrode group, and the coordinate calculation is performed using the composite detection values of a plurality of (e.g., three) electrode groups including the electrode group having the electrode 12 the detection value S(m, n) of which is the maximum detection value Smax. This can enhance the accuracy in acquiring the coordinates of the object to be detected F at a relatively far position.

First Embodiment

The first embodiment describes an example where the number of electrodes grouped in the coordinate calculation is changed depending on the magnitude of the maximum detection value Smax. More specifically, a first threshold Sth1 and a second threshold Sth2 larger than the first threshold Sth1 are set for the maximum detection value Smax. The first threshold Sth1 and the second threshold Sth2 are stored in the storage 46 provided in the processing circuit 23, for example.

Figure 12:
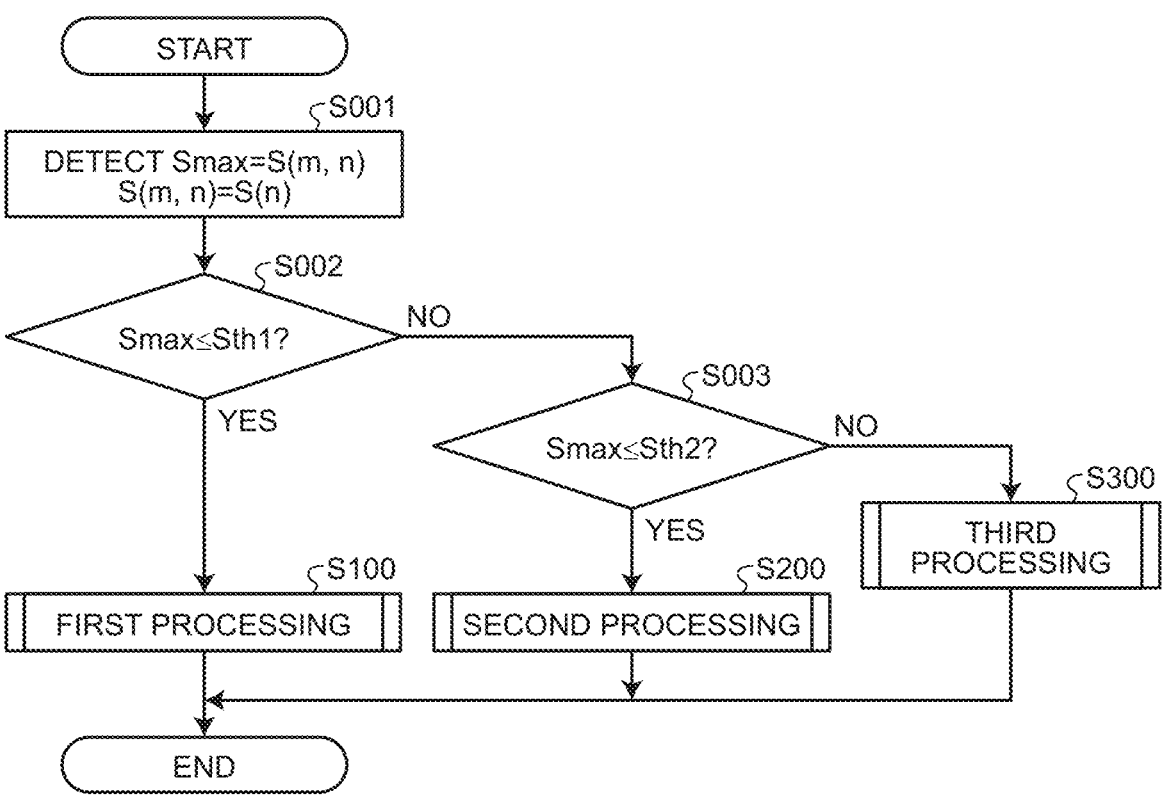
FIG. 12 is a flowchart of a specific example of the coordinate calculation according to a first embodiment.

FIG. 12 is a flowchart of a specific example of the coordinate calculation according to the first embodiment. As in the explanation of the coordinate calculation according to the comparative example, the following describes an example of calculating the data Ry out of the spatial coordinates R(Rx, Ry, Rz) of the object to be detected F.

In the coordinate calculation according to the first embodiment, the coordinate calculator 45 extracts the electrode 12 the detection value S(m, n) of which is the largest and detects the detection value S(m, n) of the extracted electrode 12 as the maximum detection value Smax (Step S001). The detection value S(m, n) of the electrode 12 in the m-th column and the n-th row detected as the maximum detection value Smax is represented by "S(n)".

The coordinate calculator 45 determines whether the maximum detection value Smax detected at Step S001 is equal to or smaller than the first threshold Sth1 (Step S002). If the maximum detection value Smax is equal to or smaller than the first threshold Sth1 (Yes at Step S002), the coordinate calculator 45 proceeds to first processing illustrated in FIG. 13 (Step S100).

Figure 13:
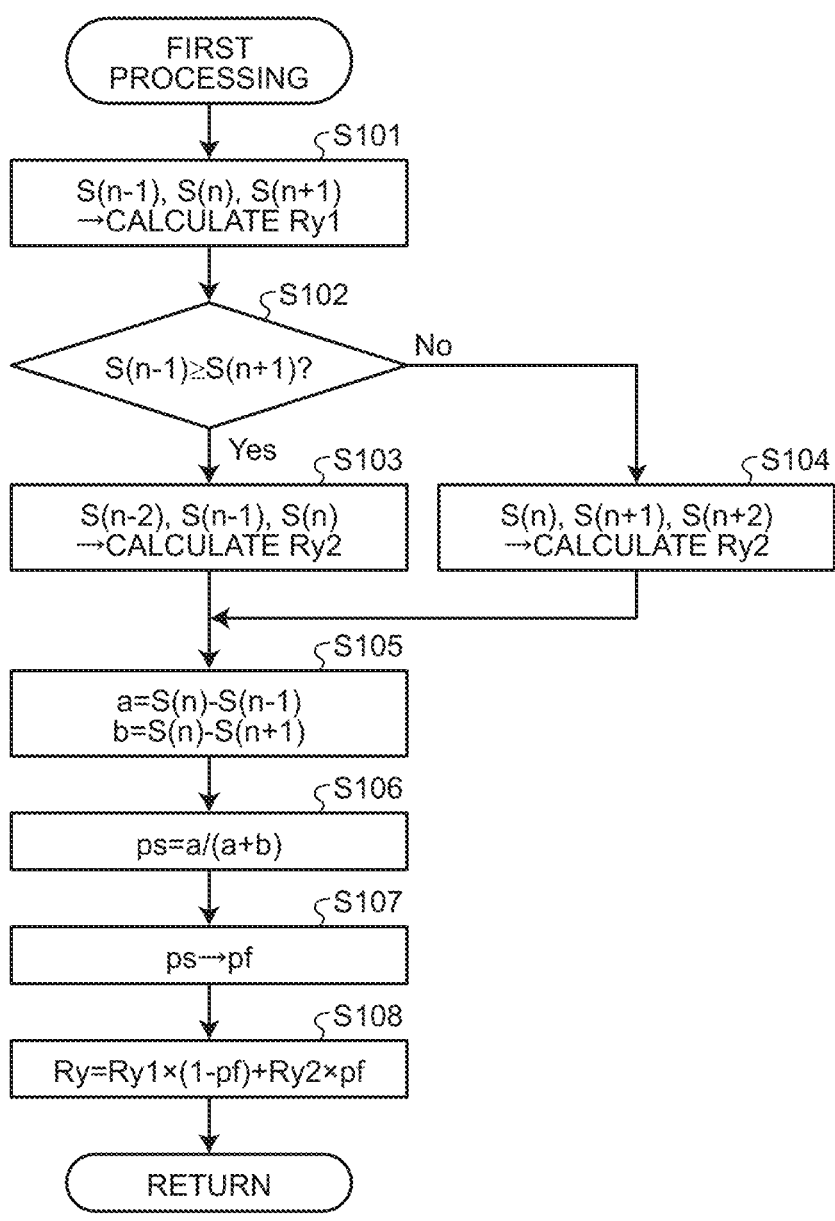
FIG. 13 is a sub-flowchart of a specific example of first processing of the coordinate calculation according to the first embodiment.
Figure 14A:
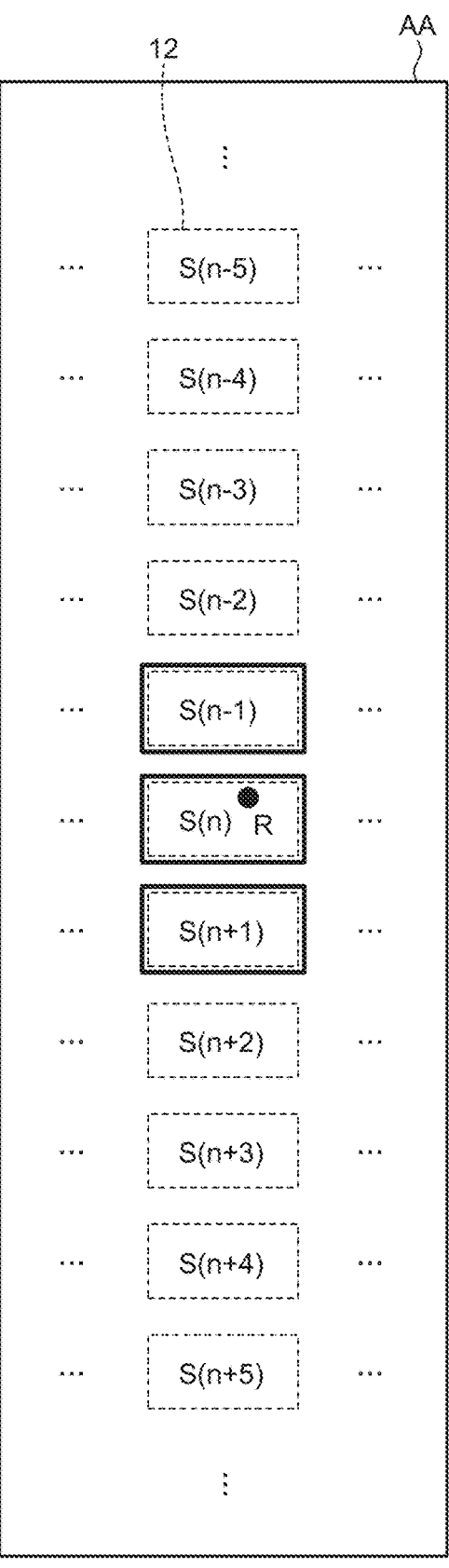
FIG. 14A is a schematic for explaining the procedure of the first processing of the coordinate calculation according to the first embodiment.
Figure 14B:
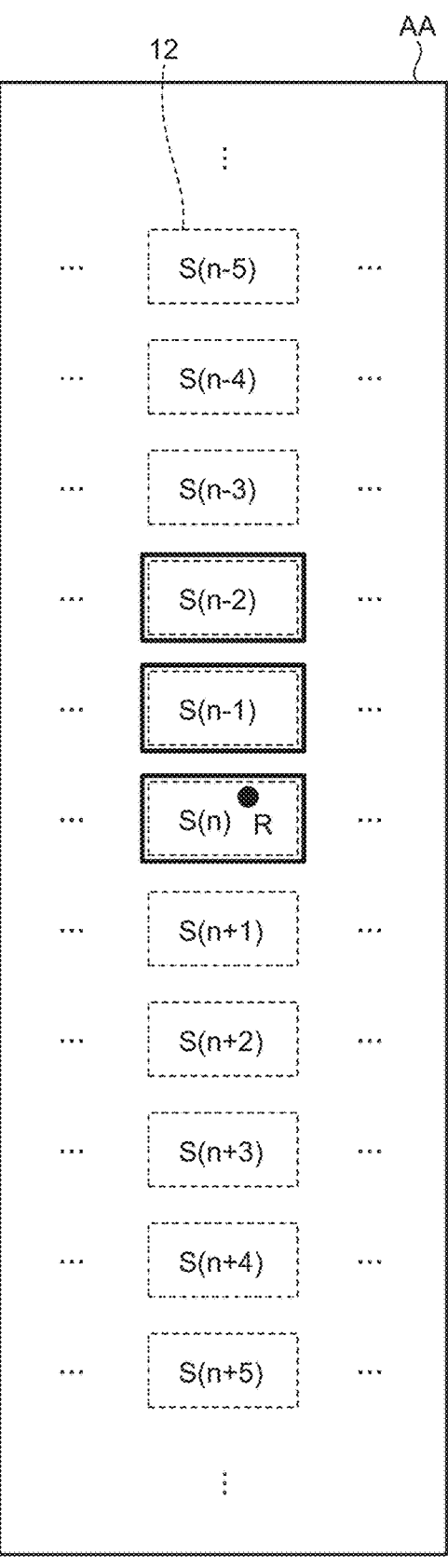
FIG. 14B is a schematic for explaining the procedure of the first processing of the coordinate calculation according to the first embodiment.
Figure 14C:
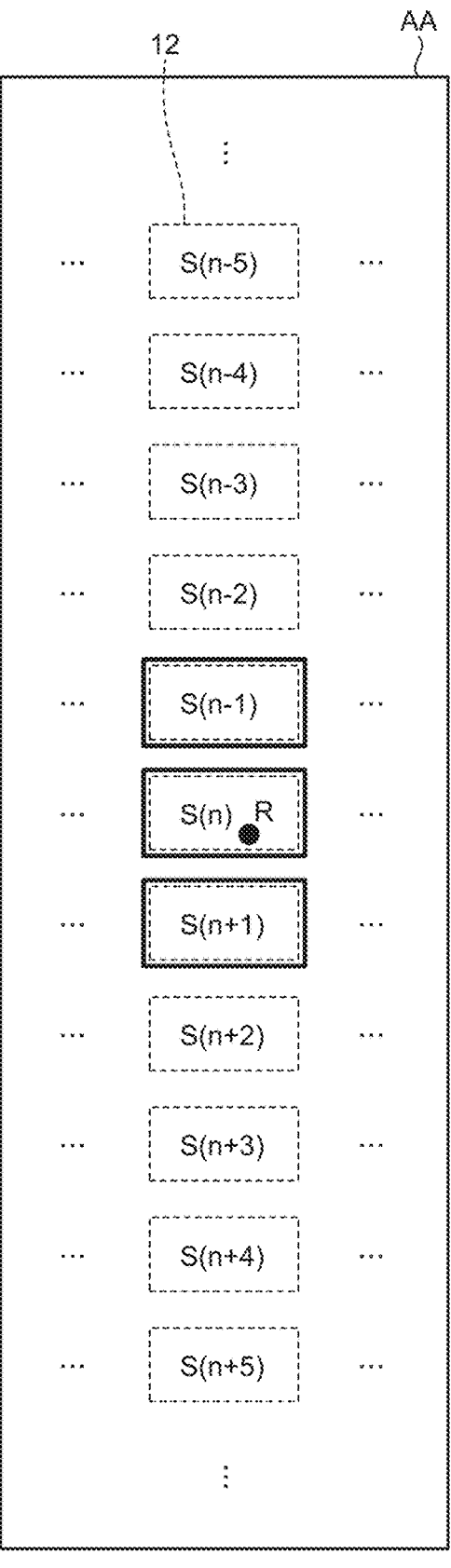
FIG. 14C is a schematic for explaining the procedure of the first processing of the coordinate calculation according to the first embodiment.
Figure 14D:
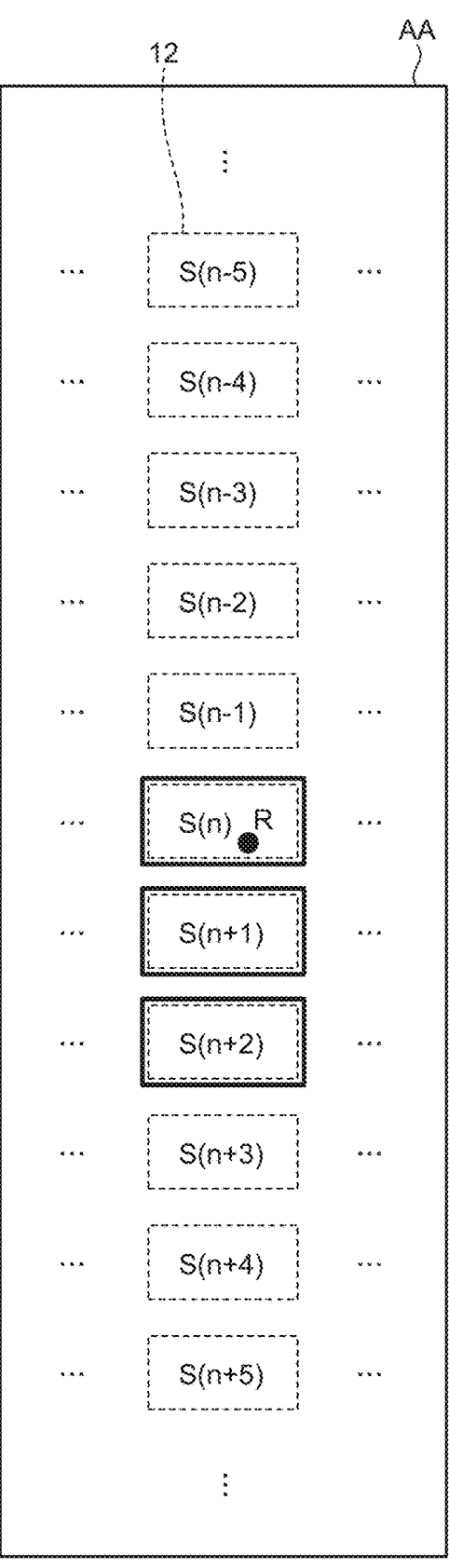
FIG. 14D is a schematic for explaining the procedure of the first processing of the coordinate calculation according to the first embodiment.

FIG. 13 is a sub-flowchart of a specific example of the first processing of the coordinate calculation according to the first embodiment. FIGS. 14A, 14B, 14C, and 14D are schematics for explaining the procedure of the first processing of the coordinate calculation according to the first embodiment. FIGS. 14A, 14B, 14C, and 14D illustrate a plurality of electrodes 12 arrayed in the short side direction (second direction) on the detection region AA. The black dots illustrated in FIGS. 14A, 14B, 14C, and 14D indicate the most proximal position of the object to be detected F on or above the detection region AA. In FIGS. 14A and 14B, the object to be detected F is in the most proximity to an upper position on the electrode 12 in the n-th row. In FIGS. 14C and 14D, the object to be detected F is in the most proximity to a lower position on the electrode 12 in the n-th row.

When proceeding to the first processing illustrated in FIG. 13, the coordinate calculator 45 calculates the first data Ry1 using the detection value S(n−1) of the electrode 12 in the n−1-th row, the detection value S(n) of the electrode 12 in the n-th row, and the detection value S(n+1) of the electrode 12 in the n+1-th row (Step S101).

Subsequently, the coordinate calculator 45 determines whether the detection value S(n−1) of the electrode 12 in the n−1-th row is equal to or larger than the detection value S(n+1) of the electrode 12 in the n+1-th row (Step S102).

As illustrated in FIG. 14A, when the object to be detected F is in the most proximity to the upper position on the electrode 12 in the n-th row, the detection value S(n−1) of the electrode 12 in the n−1-th row is equal to or larger than the detection value S(n+1) of the electrode 12 in the n+1-th row (Yes at Step S102). In this case, as illustrated in FIG. 14B, the second data Ry2 is calculated using the detection value S(n−2) of the electrode 12 in the n−2-th row, the detection value S(n−1) of the electrode 12 in the n−1-th row, and the detection value S(n) of the electrode 12 in the n-th row (Step S103).

By contrast, as illustrated in FIG. 14C, when the object to be detected F is in the most proximity to the lower position on the electrode 12 in n-th row, the detection value S(n−1) of the electrode 12 in the n−1-th row is smaller than the detection value S(n+1) of the electrode 12 in the n+1-th row (No at Step S102). In this case, as illustrated in FIG. 14D, the second data Ry2 is calculated using the detection value S(n) of the electrode 12 in the n-th row, the detection value S(n+1) of the electrode 12 in the n+1-th row, and the detection value S(n+2) of the electrode 12 in the n+2-th row (Step S104).

The coordinate calculator 45 calculates the difference "a" between the detection value S(n) of the electrode 12 in the n-th row and the detection value S(n−1) of the electrode 12 in the n−1-th row and calculates the difference "b" between the detection value S(n) of the electrode 12 in the n-th row and the detection value S(n+1) of the electrode 12 in the n+1-th row (Step S105). Subsequently, the coordinate calculator 45 calculates the detection value ratio ps using Expression (1) above (Step S106) and derives the composition ratio pf using the data composition ratio table illustrated in FIG. 9 (Step S107).

Subsequently, the coordinate calculator 45 calculates the data Ry indicating the position of the object to be detected F in the short side direction (second direction) on or above the detection region AA using Expression (2) above (Step S108).

As illustrated in FIGS. 14A and 14B, when the object to be detected F is in the most proximity to the upper position on the electrode 12 in the n-th row, the detection value S(n−1) of the electrode 12 in the n−1-th row is larger than the detection value S(n+1) of the electrode 12 in the n+1-th row. As a result, the difference "a" between the detection value S(n) of the electrode 12 in the n-th row and the detection value S(n−1) of the electrode 12 in the n−1-th row is smaller than the difference "b" between the detection value S(n) of the electrode 12 in the n-th row and the detection value S(n+1) of the electrode 12 in the n+1-th row. Therefore, the ratio of the first data Ry1 to the data Ry is larger than that of the second data Ry2 by the processing from Step S106 to Step S108 using Expression (1) above, the data composition ratio table illustrated in FIG. 9, and Expression (2) above.

By contrast, as illustrated in FIGS. 14C and 14D, when the object to be detected F is in the most proximity to the lower position on the electrode 12 in the n-th row, the detection value S(n−1) of the electrode 12 in the n−1-th row is smaller than the detection value S(n+1) of the electrode 12 in the n+1-th row. As a result, the difference "a" between the detection value S(n) of the electrode 12 in the n-th row and the detection value S(n−1) of the electrode 12 in the n−1-th row is larger than the difference "b" between the detection value S(n) of the electrode 12 in the n-th row and the detection value S(n+1) of the electrode 12 in the n+1-th row. Therefore, the ratio of the first data Ry1 to the data Ry is smaller than that of the second data Ry2 by the processing from Step S106 to Step S108 using Expression (1) above, the data composition ratio table illustrated in FIG. 9, and Expression (2) above.

As illustrated in FIGS. 10 and 11, the electrode 12 in the aspect according to the embodiment has a smaller width in one direction (second direction) than that in the other direction (first direction). In this aspect, when the maximum detection value Smax is equal to or smaller than the first threshold Sth1 (Yes at Step S002), the data Ry indicating the position of the object to be detected F in the short side direction (second direction) on or above the detection region AA is calculated by acquiring the first data Ry1 and the second data Ry2 corresponding to the position on the electrode to which the object to be detected F is in the most proximity by using the detection values of a plurality of electrodes 12 arrayed in the short side direction (second direction), and compositing the first data Ry1 and the second data Ry2 in a ratio corresponding to the position on the electrode to which the object to be detected F is in the most proximity. This can enhance the coordinate acquisition accuracy when the maximum detection value Smax is equal to or smaller than the first threshold Sth1.

If the maximum detection value Smax exceeds the first threshold Sth1 (No at Step S002), the coordinate calculator 45 determines whether the maximum detection value Smax is equal to or smaller than the second threshold Sth2 (Step S003). If the maximum detection value Smax is equal to or smaller than the second threshold Sth2 (Yes at Step S003), the coordinate calculator 45 proceeds to second processing illustrated in FIG. 15 (Step S200).

Figure 15:
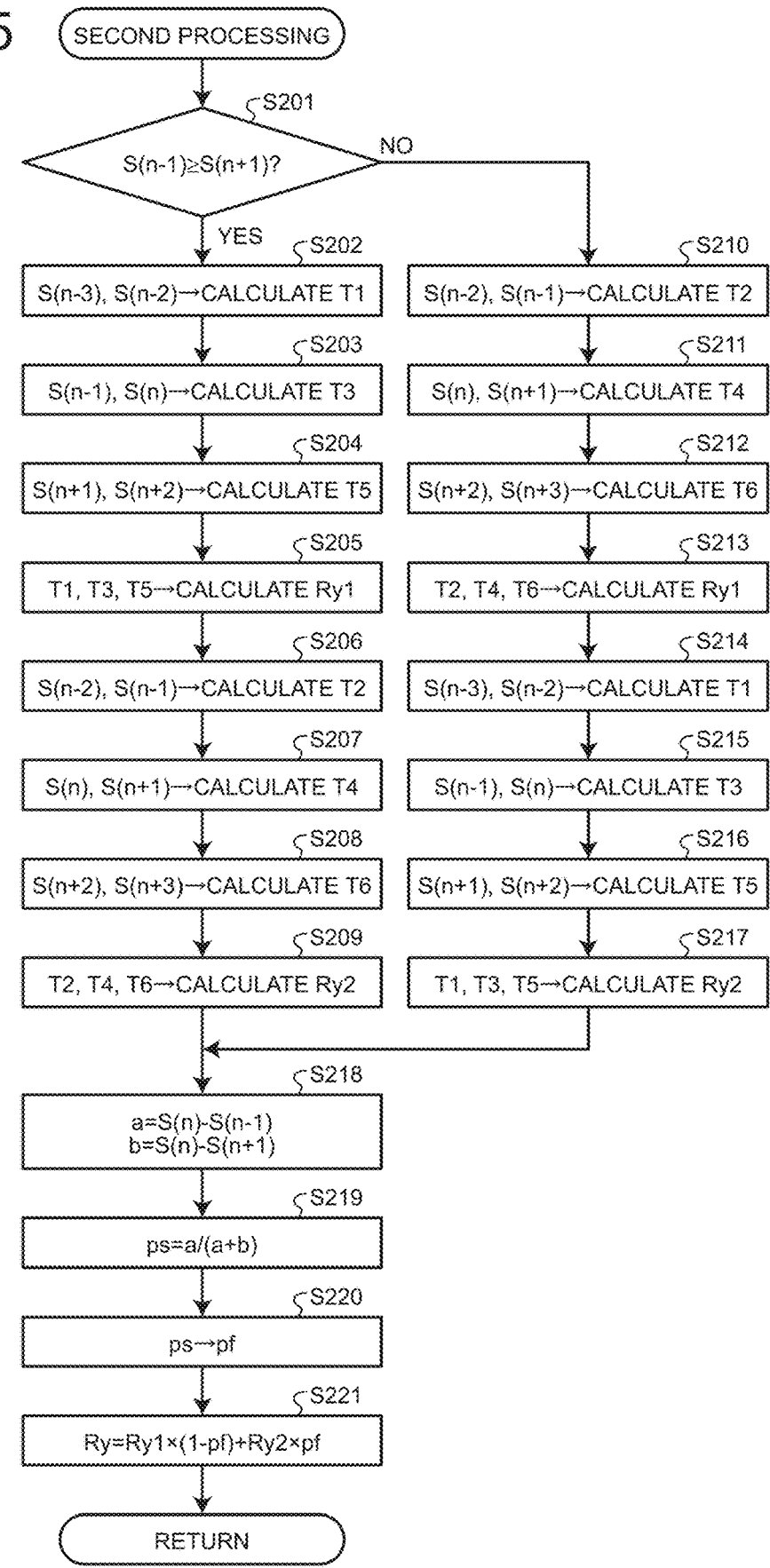
FIG. 15 is a sub-flowchart of a specific example of second processing of the coordinate calculation according to the first embodiment.

FIG. 15 is a sub-flowchart of a specific example of the second processing of the coordinate calculation according to the first embodiment. FIGS. 16A, 16B, 16C, and 16D are schematics for explaining the procedure of the second processing of the coordinate calculation according to the first embodiment.

When proceeding to the second processing illustrated in FIG. 15, the coordinate calculator 45 determines whether the detection value S(n−1) of the electrode 12 in the n−1-th row is equal to or larger than the detection value S(n+1) of the electrode 12 in the n+1-th row (Step S201).

Figure 16A:
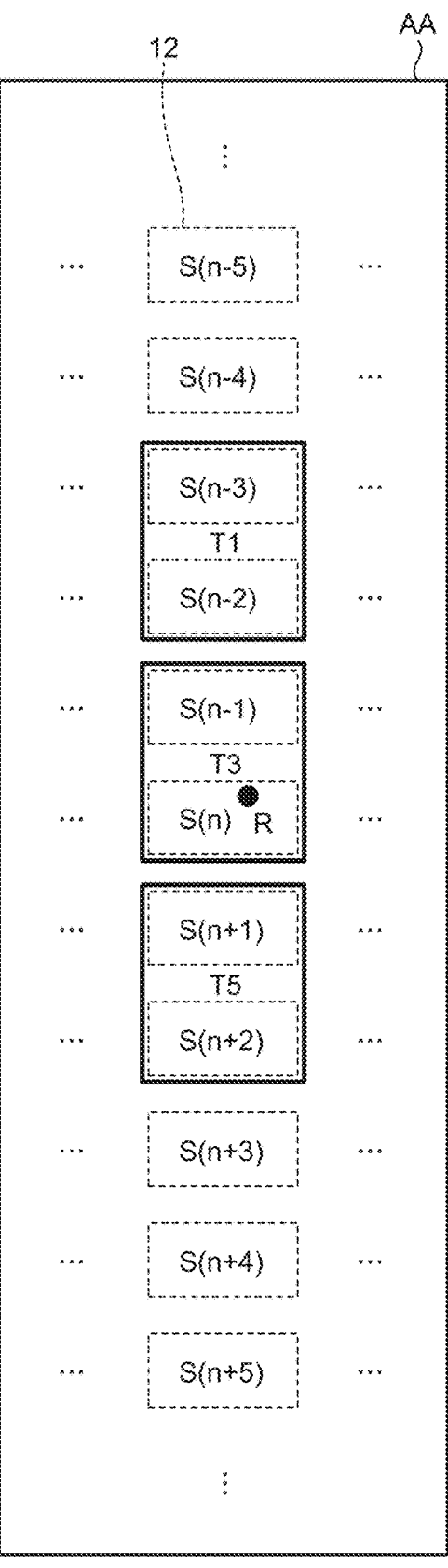
FIG. 16A is a schematic for explaining the procedure of the second processing of the coordinate calculation according to the first embodiment.

As illustrated in FIG. 16A, when the object to be detected F is in the most proximity to the upper position on the electrode 12 in the n-th row, the detection value S(n−1) of the electrode 12 in the n−1-th row is equal to or larger than the detection value S(n+1) of the electrode 12 in the n+1-th row (Yes at Step S201). In this case, the coordinate calculator 45 groups the electrode 12 in the n−3-th row and the electrode 12 in the n−2-th row together into one electrode group as illustrated in FIG. 16A and calculates a composite detection value T1 of the electrode group (Step S202). The composite detection value T1 of the electrode group composed of the electrode 12 in the n−3-th row and the electrode 12 in the n−2-th row is calculated as the composite value of the detection value S(n−3) of the electrode 12 in the n−3-th row and the detection value S(n−2) of the electrode 12 in the n−2-th row, for example.

The coordinate calculator 45 groups the electrode 12 in the n−1-th row and the electrode 12 in the n-th row together into one electrode group as illustrated in FIG. 16A and calculates a composite detection value T3 of the electrode group (Step S203). The composite detection value T3 of the electrode group composed of the electrode 12 in the n−1-th row and the electrode 12 in the n-th row is calculated as the composite value of the detection value S(n−1) of the electrode 12 in the n−1-th row and the detection value S(n) of the electrode 12 in the n-th row, for example.

The coordinate calculator 45 groups the electrode 12 in the n+1-th row and the electrode 12 in the n+2-th row together into one electrode group as illustrated in FIG. 16A and calculates a composite detection value T5 of the electrode group (Step S204). The composite detection value T5 of the electrode group composed of the electrode 12 in the n+1-th row and the electrode 12 in the n+2-th row is calculated as the composite value of the detection value S(n+1) of the electrode 12 in the n+1-th row and the detection value S(n+2) of the electrode 12 in the n+2-th row, for example.

Subsequently, the coordinate calculator 45 calculates the first data Ry1 using the composite detection value T1 of the electrode group composed of the electrode 12 in the n−3-th row and the electrode 12 in the n−2-th row, the composite detection value T3 of the electrode group composed of the electrode 12 in the n−1-th row and the electrode 12 in the n-th row, and the composite detection value T5 of the electrode group composed of the electrode 12 in the n+1-th row and the electrode 12 in the n+2-th row (Step S205).

Figure 16B:
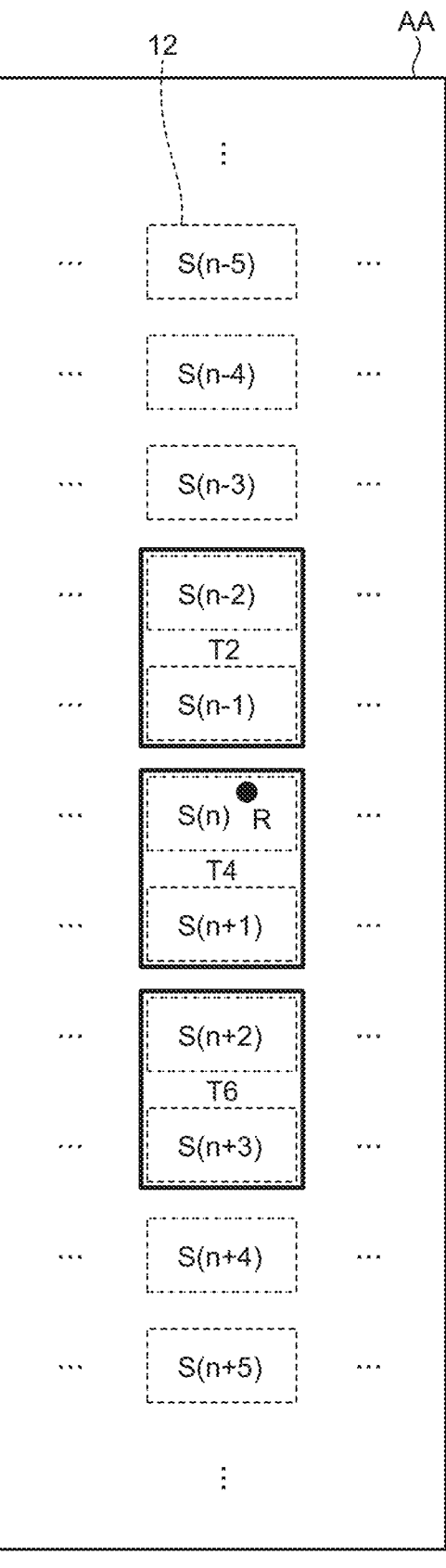
FIG. 16B is a schematic for explaining the procedure of the second processing of the coordinate calculation according to the first embodiment.

Subsequently, the coordinate calculator 45 groups the electrode 12 in the n−2-th row and the electrode 12 in the n−1-th row together into one electrode group as illustrated in FIG. 16B and calculates a composite detection value T2 of the electrode group (Step S206). The composite detection value T2 of the electrode group composed of the electrode 12 in the n−2-th row and the electrode 12 in the n−1-th row is calculated as the composite value of the detection value S(n−2) of the electrode 12 in the n−2-th row and the detection value S(n−1) of the electrode 12 in the n−1-th row, for example.

The coordinate calculator 45 groups the electrode 12 in the n-th row and the electrode 12 in the n+1-th row together into one electrode group as illustrated in FIG. 16B and calculates a composite detection value T4 of the electrode group (Step S207). The composite detection value T4 of the electrode group composed of the electrode 12 in the n-th row and the electrode 12 in the n+1-th row is calculated as the composite value of the detection value S(n) of the electrode 12 in the n-th row and the detection value S(n+1) of the electrode 12 in the n+1-th row, for example.

The coordinate calculator 45 groups the electrode 12 in the n+2-th row and the electrode 12 in the n+3-th row together into one electrode group as illustrated in FIG. 16B and calculates a composite detection value T6 of the electrode group (Step S208). The composite detection value T6 of the electrode group composed of the electrode 12 in the n+2-th row and the electrode 12 in the n+3-th row is calculated as the composite value of the detection value S(n+2) of the electrode 12 in the n+2-th row and the detection value S(n+3) of the electrode 12 in the n+3-th row, for example.

Subsequently, the coordinate calculator 45 calculates the second data Ry2 using the composite detection value T2 of the electrode group composed of the electrode 12 in the n−2-th row and the electrode 12 in the n−1-th row, the composite detection value T4 of the electrode group composed of the electrode 12 in the n-th row and the electrode 12 in the n+1-th row, and the composite detection value T6 of the electrode group composed of the electrode 12 in the n+2-th row and the electrode 12 in the n+3-th row (Step S209).

Figure 16C:
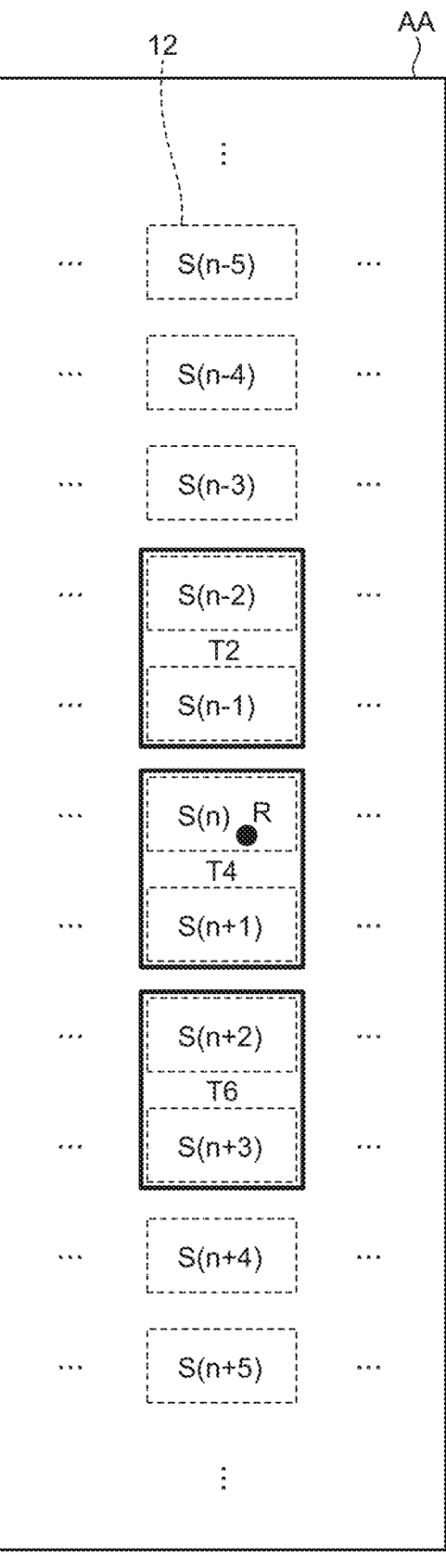
FIG. 16C is a schematic for explaining the procedure of the second processing of the coordinate calculation according to the first embodiment.

As illustrated in FIG. 16C, when the object to be detected F is in the most proximity to the lower position on the electrode 12 in n-th row, the detection value S(n−1) of the electrode 12 in the n−1-th row is smaller than the detection value S(n+1) of the electrode 12 in the n+1-th row (No at Step S201). In this case, the coordinate calculator 45 groups the electrode 12 in the n−2-th row and the electrode 12 in the n−1-th row together into one electrode group as illustrated in FIG. 16C and calculates the composite detection value T2 of the electrode group (Step S210).

The coordinate calculator 45 groups the electrode 12 in the n-th row and the electrode 12 in the n+1-th row together into one electrode group as illustrated in FIG. 16C and calculates the composite detection value T4 of the electrode group (Step S211).

The coordinate calculator 45 groups the electrode 12 in the n+2-th row and the electrode 12 in the n+3-th row together into one electrode group as illustrated in FIG. 16C and calculates the composite detection value T6 of the electrode group (Step S212).

Subsequently, the coordinate calculator 45 calculates the first data Ry1 using the composite detection value T2 of the electrode group composed of the electrode 12 in the n−2-th row and the electrode 12 in the n−1-th row, the composite detection value T4 of the electrode group composed of the electrode 12 in the n-th row and the electrode 12 in the n+1-th row, and the composite detection value T6 of the electrode group composed of the electrode 12 in the n+2-th row and the electrode 12 in the n+3-th row (Step S213).

Figure 16D:
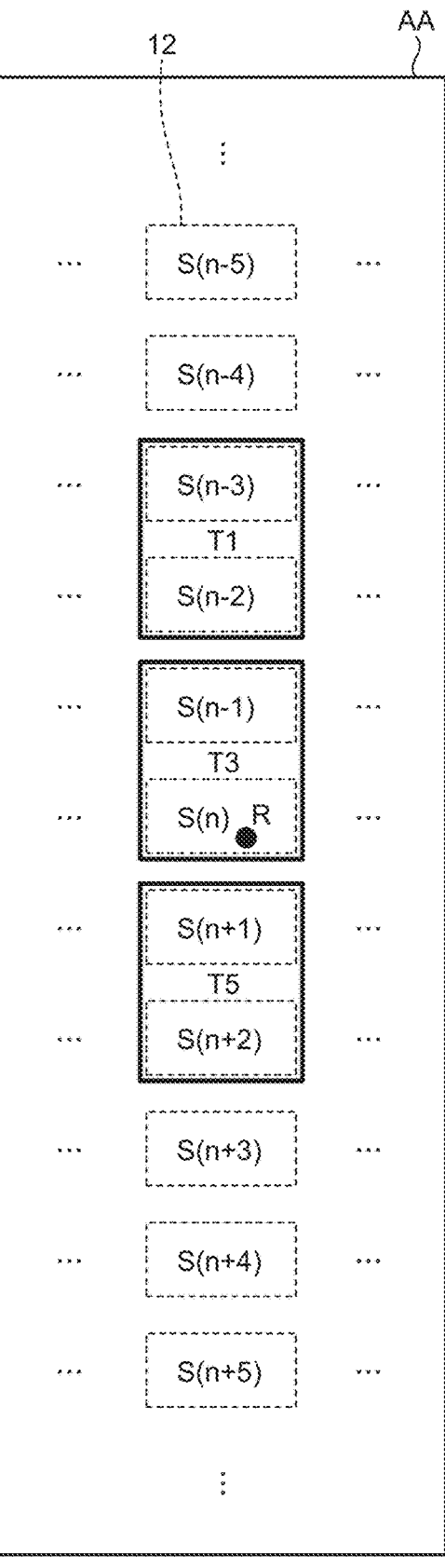
FIG. 16D is a schematic for explaining the procedure of the second processing of the coordinate calculation according to the first embodiment.

Subsequently, the coordinate calculator 45 groups the electrode 12 in the n−3-th row and the electrode 12 in the n−2-th row together into one electrode group as illustrated in FIG. 16D and calculates the composite detection value T1 of the electrode group (Step S214).

The coordinate calculator 45 groups the electrode 12 in the n−1-th row and the electrode 12 in the n-th row together into one electrode group as illustrated in FIG. 16D and calculates the composite detection value T3 of the electrode group (Step S215).

The coordinate calculator 45 groups the electrode 12 in the n+1-th row and the electrode 12 in the n+2-th row together into one electrode group as illustrated in FIG. 16D and calculates the composite detection value T5 of the electrode group (Step S216).

Subsequently, the coordinate calculator 45 calculates the second data Ry2 using the composite detection value T1 of the electrode group composed of the electrode 12 in the n−3-th row and the electrode 12 in the n−2-th row, the composite detection value T3 of the electrode group composed of the electrode 12 in the n−1-th row and the electrode 12 in the n-th row, and the composite detection value T5 of the electrode group composed of the electrode 12 in the n+1-th row and the electrode 12 in the n+2-th row (Step S217).

The coordinate calculator 45 calculates the difference "a" between the detection value S(n) of the electrode 12 in the n-th row and the detection value S(n−1) of the electrode 12 in the n−1-th row and calculates the difference "b" between the detection value S(n) of the electrode 12 in the n-th row and the detection value S(n+1) of the electrode 12 in the n+1-th row (Step S218). Subsequently, the coordinate calculator 45 calculates the detection value ratio ps using Expression (1) above (Step S219) and derives the composition ratio pf using the data composition ratio table illustrated in FIG. 9 (Step S220).

Subsequently, the coordinate calculator 45 calculates the data Ry indicating the position of the object to be detected F in the short side direction (second direction) on or above the detection region AA using Expression (2) above (Step S221).

As illustrated in FIGS. 16A and 16B, when the object to be detected F is in the most proximity to the upper position on the electrode 12 in the n-th row, the detection value S(n−1) of the electrode 12 in the n−1-th row is larger than the detection value S(n+1) of the electrode 12 in the n+1-th row. As a result, the difference "a" between the detection value S(n) of the electrode 12 in the n-th row and the detection value S(n−1) of the electrode 12 in the n−1-th row is smaller than the difference "b" between the detection value S(n) of the electrode 12 in the n-th row and the detection value S(n+1) of the electrode 12 in the n+1-th row. Therefore, the ratio of the first data Ry1 to the data Ry is larger than that of the second data Ry2 by the processing from Step S219 to Step S221 using Expression (1) above, the data composition ratio table illustrated in FIG. 9, and Expression (2) above.

By contrast, as illustrated in FIGS. 16C and 16D, when the object to be detected F is in the most proximity to the lower position on the electrode 12 in the n-th row, the detection value S(n−1) of the electrode 12 in the n−1-th row is smaller than the detection value S(n+1) of the electrode 12 in the n+1-th row. As a result, the difference "a" between the detection value S(n) of the electrode 12 in the n-th row and the detection value S(n−1) of the electrode 12 in the n−1-th row is larger than the difference "b" between the detection value S(n) of the electrode 12 in the n-th row and the detection value S(n+1) of the electrode 12 in the n+1-th row. Therefore, the ratio of the first data Ry1 to the data Ry is smaller than that of the second data Ry2 by the processing from Step S219 to Step S221 using Expression (1) above, the data composition ratio table illustrated in FIG. 9, and Expression (2) above.

As described above, in the aspect of the embodiment where the width of the electrode 12 in one direction (second direction) is smaller than the width in the other direction (first direction) (refer to FIG. 10 and FIG. 11), if the maximum detection value Smax exceeds the first threshold Sth1 (No at Step S002) and is equal to or smaller than the second threshold Sth2 larger than the first threshold Sth1 (Yes at Step S003), two electrodes 12 arrayed in the short side direction (second direction) are grouped together into one electrode group, and the composite value of the detection values of the two electrodes included in the electrode group is calculated as the composite detection value of the electrode group. Then, the data Ry indicating the position of the object to be detected F in the short side direction (second direction) on or above the detection region AA is calculated by acquiring the first data Ry1 and the second data Ry2 corresponding to the position on the electrode to which the object to be detected F is in the most proximity by using the composite detection value of a plurality of electrode groups arrayed in the short side direction (second direction), and compositing the first data Ry1 and the second data Ry2 in a ratio corresponding to the position on the electrode to which the object to be detected F is in the most proximity. This can enhance the coordinate acquisition accuracy when the maximum detection value Smax exceeds the first threshold Sth1 and is equal to or smaller than the second threshold.

Figure 17:
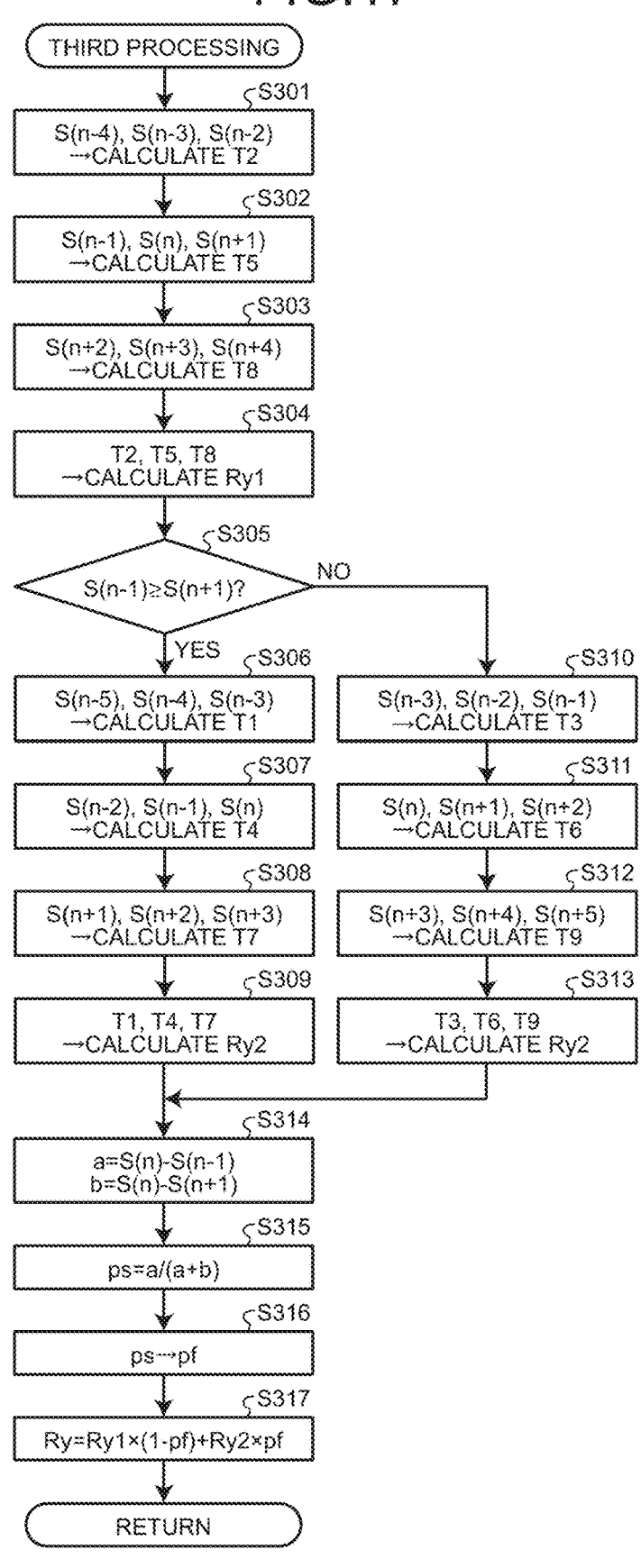
FIG. 17 is a sub-flowchart of a specific example of third processing of the coordinate calculation according to the first embodiment.

If the maximum detection value Smax exceeds the second threshold Sth2 (No at Step S003), the coordinate calculator 45 proceeds to third processing illustrated in FIG. 17 (Step S300).

FIG. 17 is a sub-flowchart of a specific example of the third processing of the coordinate calculation according to the first embodiment. FIGS. 18A, 18B, 18C, and 18D are schematics for explaining the procedure of the third processing of the coordinate calculation according to the first embodiment.

Figure 18A:
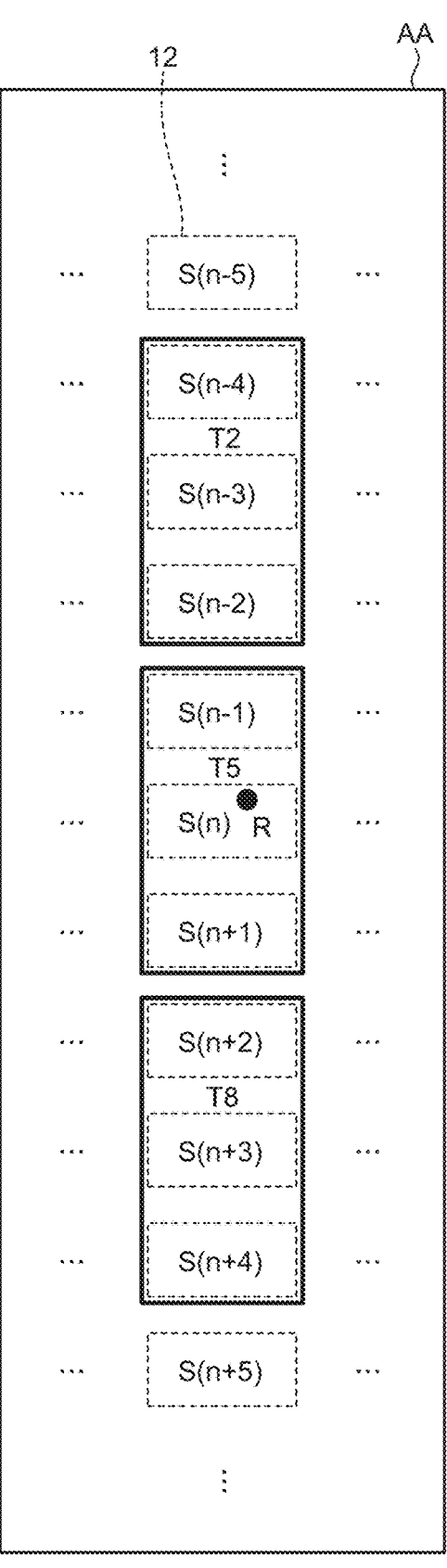
FIG. 18A is a schematic for explaining the procedure of the third processing of the coordinate calculation according to the first embodiment.
Figure 18B:
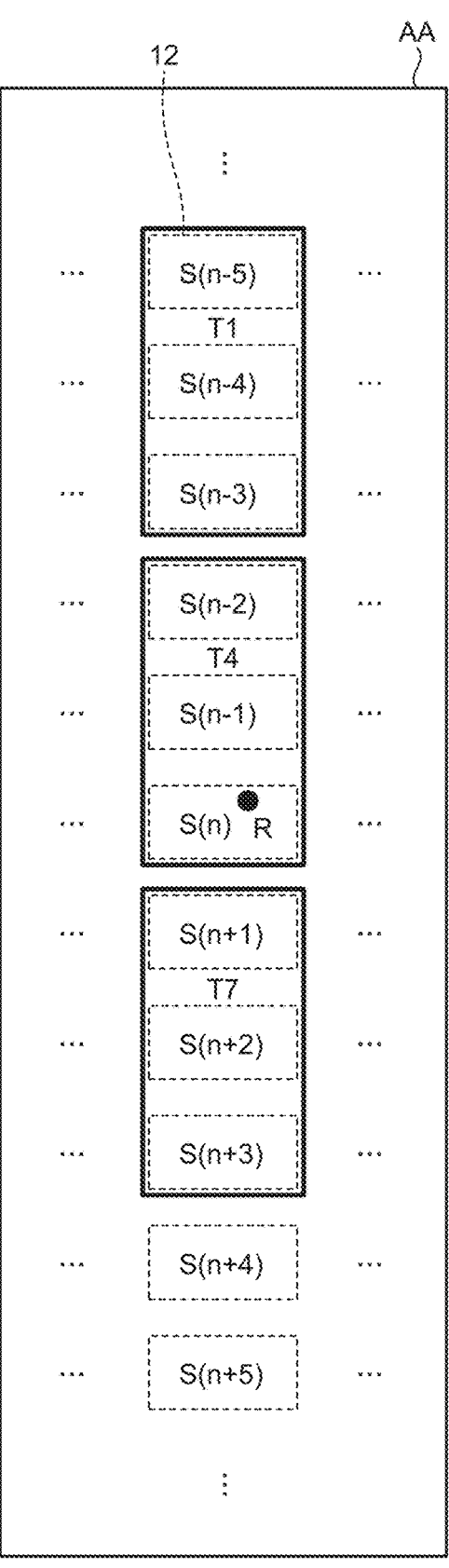
FIG. 18B is a schematic for explaining the procedure of the third processing of the coordinate calculation according to the first embodiment.
Figure 18C:
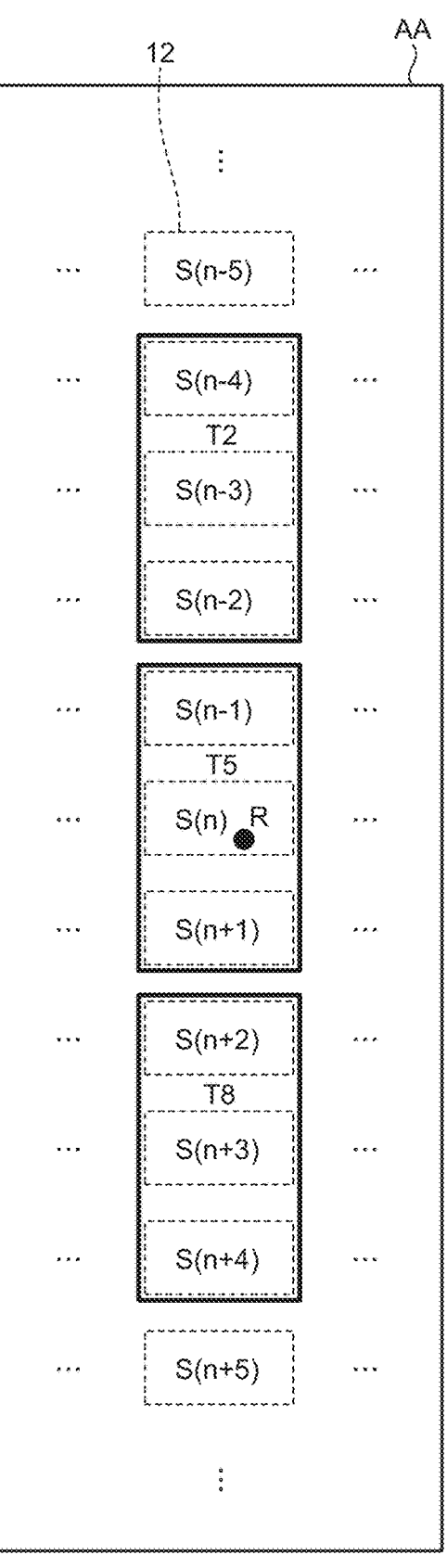
FIG. 18C is a schematic for explaining the procedure of the third processing of the coordinate calculation according to the first embodiment.

When proceeding to the third processing illustrated in FIG. 17, the coordinate calculator 45 groups the electrode 12 in the n−4-th row, the electrode 12 in the n−3-th row, and the electrode 12 in the n−2-th row together into one electrode group as illustrated in FIG. 18A and FIG. 18C and calculates the composite detection value T2 of the electrode group (Step S301). The composite detection value T2 of the electrode group composed of the electrode 12 in the n−4-th row, the electrode 12 in the n−3-th row, and the electrode 12 in the n−2-th row is calculated as the composite value of the detection value S(n−4) of the electrode 12 in the n−4-th row, the detection value S(n−3) of the electrode 12 in the n−3-th row, and the detection value S(n−2) of the electrode 12 in the n−2-th row, for example.

The coordinate calculator 45 groups the electrode 12 in the n−1-th row, the electrode 12 in the n-th row, and the electrode 12 in the n+1-th row together into one electrode group as illustrated in FIG. 18A and FIG. 18C and calculates the composite detection value T5 of the electrode group (Step S302). The composite detection value T5 of the electrode group composed of the electrode 12 in the n−1-th row, the electrode 12 in the n-th row, and the electrode 12 in the n+1-th row is calculated as the composite value of the detection value S(n−1) of the electrode 12 in the n−1-th row, the detection value S(n) of the electrode 12 in the n-th row, and the detection value S(n+1) of the electrode 12 in the n+1-th row, for example.

The coordinate calculator 45 groups the electrode 12 in the n+2-th row, the electrode 12 in the n+3-th row, and the electrode 12 in the n+4-th row together into one electrode group as illustrated in FIG. 18A and FIG. 18C and calculates a composite detection value T8 of the electrode group (Step S303). The composite detection value T8 of the electrode group composed of the electrode 12 in the n+2-th row, the electrode 12 in the n+3-th row, and the electrode 12 in the n+4-th row is calculated as the composite value of the detection value S(n+2) of the electrode 12 in the n+2-th row, the detection value S(n+3) of the electrode 12 in the n+3-th row, and the detection value S(n+4) of the electrode 12 in the n+4-th row, for example.

Subsequently, the coordinate calculator 45 calculates the first data Ry1 using the composite detection value T2 of the electrode group composed of the electrode 12 in the n−4-th row, the electrode 12 in the n−3-th row, and the electrode 12 in the n−2-th row, the composite detection value T5 of the electrode group composed of the electrode 12 in the n−1-th row, the electrode 12 in the n-th row, and the electrode 12 in the n+1-th row, and the composite detection value T8 of the electrode group composed of the electrode 12 in the n+2-th row, the electrode 12 in the n+3-th row, and the electrode 12 in the n+4-th row (Step S304).

Subsequently, the coordinate calculator 45 determines whether the detection value S(n−1) of the electrode 12 in the n−1-th row is equal to or larger than the detection value S(n+1) of the electrode 12 in the n+1-th row (Step S305).

As illustrated in FIG. 18A, when the object to be detected F is in the most proximity to the upper position on the electrode 12 in the n-th row, the detection value S (n−1) of the electrode 12 in the n−1-th row is equal to or larger than the detection value S(n+1) of the electrode 12 in the n+1-th row (Yes at Step S305). In this case, the coordinate calculator 45 groups the electrode 12 in the n−5-th row, the electrode 12 in the n−4-th row, and the electrode 12 in the n−3-th row together into one electrode group as illustrated in FIG. 18B and calculates the composite detection value T1 of the electrode group (Step S306). The composite detection value T1 of the electrode group composed of the electrode 12 in the n−5-th row, the electrode 12 in the n−4-th row, and the electrode 12 in the n−3-th row is calculated as the composite value of the detection value S(n−5) of the electrode 12 in the n−5-th row, the detection value S(n−4) of the electrode 12 in the n−4-th row, and the detection value S(n−3) of the electrode 12 in the n−3-th row, for example.

The coordinate calculator 45 groups the electrode 12 in the n−2-th row, the electrode 12 in the n−1-th row, and the electrode 12 in the n-th row together into one electrode group as illustrated in FIG. 18B and calculates the composite detection value T4 of the electrode group (Step S307). The composite detection value T4 of the electrode group composed of the electrode 12 in the n−2-th row, the electrode 12 in the n−1-th row, and the electrode 12 in the n-th row is calculated as the composite value of the detection value S(n−2) of the electrode 12 in the n−2-th row, the detection value S(n−1) of the electrode 12 in the n−1-th row, and the detection value S(n) of the electrode 12 in the n-th row, for example.

The coordinate calculator 45 groups the electrode 12 in the n+1-th row, the electrode 12 in the n+2-th row, and the electrode 12 in the n+3-th row together into one electrode group as illustrated in FIG. 18B and calculates a composite detection value T7 of the electrode group (Step S308). The composite detection value T7 of the electrode group composed of the electrode 12 in the n+1-th row, the electrode 12 in the n+2-th row, and the electrode 12 in the n+3-th row is calculated as the composite value of the detection value S(n+1) of the electrode 12 in the n+1-th row, the detection value S(n+2) of the electrode 12 in the n+2-th row, and the detection value S(n+3) of the electrode 12 in the n+3-th row, for example.

Subsequently, the coordinate calculator 45 calculates the second data Ry2 using the composite detection value T1 of the electrode group composed of the electrode 12 in the n−5-th row, the electrode 12 in the n−4-th row, and the electrode 12 in the n−3-th row, the composite detection value T4 of the electrode group composed of the electrode 12 in the n−2-th row, the electrode 12 in the n−1-th row, and the electrode 12 in the n-th row, and the composite detection value T7 of the electrode group composed of the electrode 12 in the n+1-th row, the electrode 12 in the n+2-th row, and the electrode 12 in the n+3-th row (Step S309).

Figure 18D:
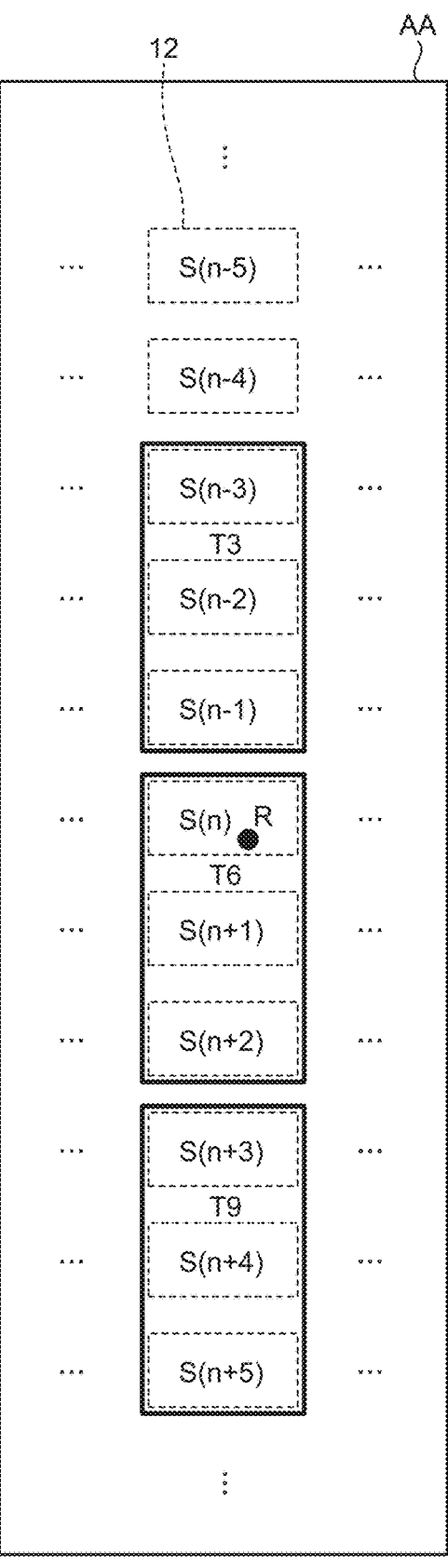
FIG. 18D is a schematic for explaining the procedure of the third processing of the coordinate calculation according to the first embodiment.

As illustrated in FIG. 18C, when the object to be detected F is in the most proximity to the lower position on the electrode 12 in n-th row, the detection value S(n−1) of the electrode 12 in the n−1-th row is smaller than the detection value S(n+1) of the electrode 12 in the n+1-th row (No at Step S305). In this case, the coordinate calculator 45 groups the electrode 12 in the n−3-th row, the electrode 12 in the n−2-th row, and the electrode 12 in the n−1-th row together into one electrode group as illustrated in FIG. 18D and calculates the composite detection value T3 of the electrode group (Step S310). The composite detection value T3 of the electrode group composed of the electrode 12 in the n−3-th row, the electrode 12 in the n–2-th row, and the electrode 12 in the n–1-th row is calculated as the composite value of the detection value S(n–3) of the electrode 12 in the n–3-th row, the detection value S(n–2) of the electrode 12 in the n–2-th row, and the detection value S(n–1) of the electrode 12 in the n–1-th row, for example.

The coordinate calculator 45 groups the electrode 12 in the n-th row, the electrode 12 in the n+1-th row, and the electrode 12 in the n+2-th row together into one electrode group as illustrated in FIG. 18D and calculates the composite detection value T6 of the electrode group (Step S311). The composite detection value T6 of the electrode group composed of the electrode 12 in the n-th row, the electrode 12 in the n+1-th row, and the electrode 12 in the n+2-th row is calculated as the composite value of the detection value S(n) of the electrode 12 in the n-th row, the detection value S(n+1) of the electrode 12 in the n+1-th row, and the detection value S(n+2) of the electrode 12 in the n+2-th row, for example.

The coordinate calculator 45 groups the electrode 12 in the n+3-th row, the electrode 12 in the n+4-th row, and the electrode 12 in the n+5-th row together into one electrode group as illustrated in FIG. 18D and calculates a composite detection value T9 of the electrode group (Step S312). The composite detection value T9 of the electrode group composed of the electrode 12 in the n+3-th row, the electrode 12 in the n+4-th row, and the electrode 12 in the n+5-th row is calculated as the composite value of the detection value S(n+3) of the electrode 12 in the n+3-th row, the detection value S(n+4) of the electrode 12 in the n+4-th row, and the detection value S(n+5) of the electrode 12 in the n+5-th row, for example.

Subsequently, the coordinate calculator 45 calculates the second data Ry2 using the composite detection value T3 of the electrode group composed of the electrode 12 in the n–3-th row, the electrode 12 in the n–2-th row, and the electrode 12 in the n–1-th row, the composite detection value T6 of the electrode group composed of the electrode 12 in the n-th row, the electrode 12 in the n+1-th row, and the electrode 12 in the n+2-th row, and the composite detection value T9 of the electrode group composed of the electrode 12 in the n+3-th row, the electrode 12 in the n+4-th row, and the electrode 12 in the n+5-th row (Step S313).

The coordinate calculator 45 calculates the difference "a" between the detection value S(n) of the electrode 12 in the n-th row and the detection value S(n–1) of the electrode 12 in the n–1-th row and calculates the difference "b" between the detection value S(n) of the electrode 12 in the n-th row and the detection value S(n+1) of the electrode 12 in the n+1-th row (Step S314). Subsequently, the coordinate calculator 45 calculates the detection value ratio ps using Expression (1) above (Step S315) and derives the composition ratio pf using the data composition ratio table illustrated in FIG. 9 (Step S316).

Subsequently, the coordinate calculator 45 calculates the data Ry indicating the position of the object to be detected F in the short side direction (second direction) on or above the detection region AA using Expression (2) above (Step S317).

As illustrated in FIGS. 18A and 18B, when the object to be detected F is in the most proximity to the upper position on the electrode 12 in the n-th row, the detection value S(n–1) of the electrode 12 in the n–1-th row is larger than the detection value S(n+1) of the electrode 12 in the n+1-th row. As a result, the difference "a" between the detection value S(n) of the electrode 12 in the n-th row and the detection value S(n–1) of the electrode 12 in the n–1-th row is smaller than the difference "b" between the detection value S(n) of the electrode 12 in the n-th row and the detection value S(n+1) of the electrode 12 in the n+1-th row. Therefore, the ratio of the first data Ry1 to the data Ry is larger than that of the second data Ry2 by the processing from Step S315 to Step S317 using Expression (1) above, the data composition ratio table illustrated in FIG. 9, and Expression (2) above.

By contrast, as illustrated in FIGS. 18C and 18D, when the object to be detected F is in the most proximity to the lower position on the electrode 12 in the n-th row, the detection value S(n–1) of the electrode 12 in the n–1-th row is smaller than the detection value S(n+1) of the electrode 12 in the n+1-th row. As a result, the difference "a" between the detection value S(n) of the electrode 12 in the n-th row and the detection value S(n–1) of the electrode 12 in the n–1-th row is larger than the difference "b" between the detection value S(n) of the electrode 12 in the n-th row and the detection value S(n+1) of the electrode 12 in the n+1-th row. Therefore, the ratio of the first data Ry1 to the data Ry is smaller than that of the second data Ry2 by the processing from Step S315 to Step S317 using Expression (1) above, the data composition ratio table illustrated in FIG. 9, and Expression (2) above.

As described above, in the aspect of the embodiment where the width of the electrode 12 in one direction (second direction) is smaller than the width in the other direction (first direction) (refer to FIG. 10 and FIG. 11), if the maximum detection value Smax exceeds the second threshold Sth2 (No at Step S003), three electrodes 12 arrayed in the short side direction (second direction) are grouped together into one electrode group, and the composite value of the detection values of the three electrodes included in the electrode group is calculated as the composite detection value of the electrode group. Then, the data Ry indicating the position of the object to be detected F in the short side direction (second direction) on or above the detection region AA is calculated by acquiring the first data Ry1 and the second data Ry2 corresponding to the position on the electrode to which the object to be detected F is in the most proximity by using the composite detection value of a plurality of electrode groups arrayed in the short side direction (second direction), and compositing the first data Ry1 and the second data Ry2 in a ratio corresponding to the position on the electrode to which the object to be detected F is in the most proximity. This can enhance the coordinate acquisition accuracy when the maximum detection value Smax exceeds the second threshold Sth2.

Modifications

Figure 19:
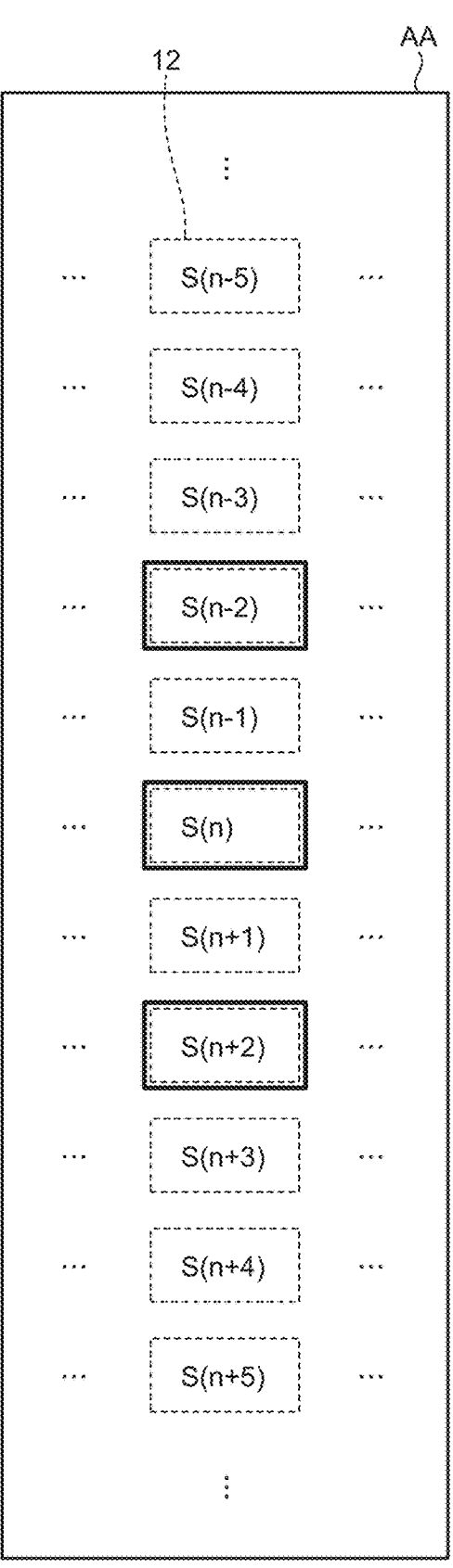
FIG. 19 is a schematic of the positional relation of a plurality of electrodes when acquiring first data and second data in the procedure of the first processing of the coordinate calculation according to a modification of the first embodiment.
Figure 20:
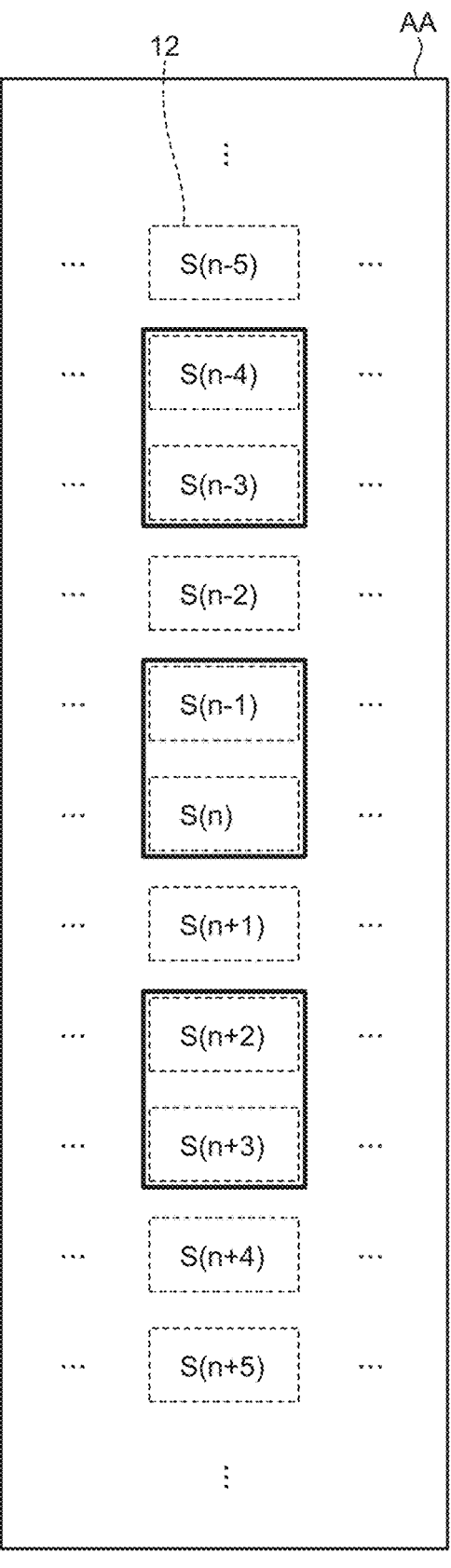
FIG. 20 is a schematic of the positional relation of a plurality of electrode groups when acquiring the first data and the second data in the procedure of the second processing of the coordinate calculation according to a modification of the first embodiment.
Figure 21:
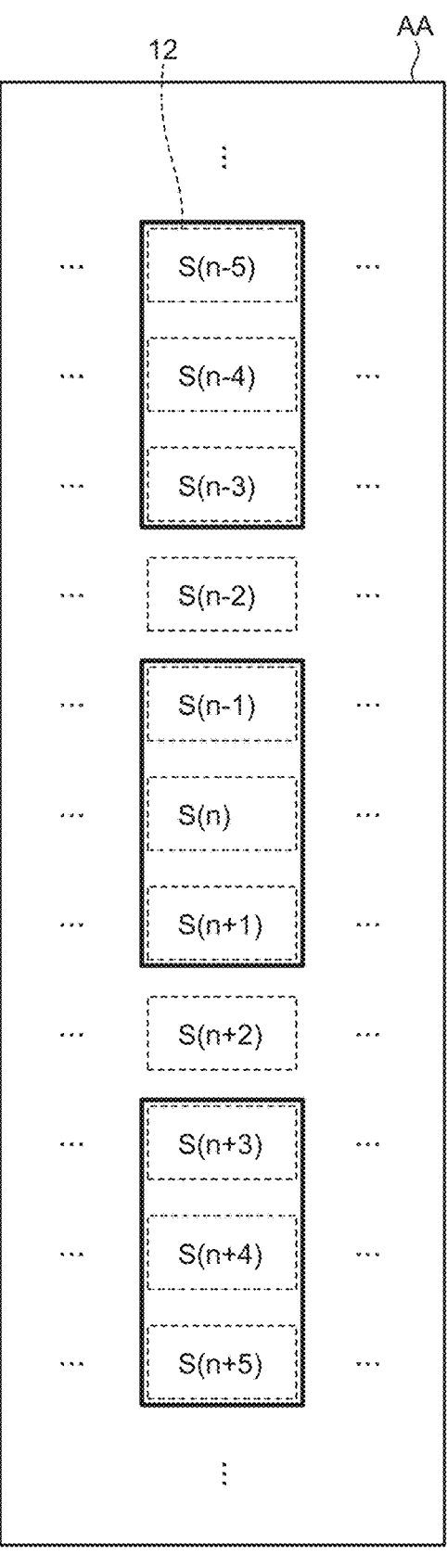
FIG. 21 is a schematic of the positional relation of a plurality of electrode groups when acquiring the first data and the second data in the procedure of the third processing of the coordinate calculation according to a modification of the first embodiment.

FIG. 19 is a schematic of the positional relation of a plurality of electrodes when acquiring the first data and the second data in the procedure of the first processing of the coordinate calculation according to a modification of the first embodiment. FIG. 20 is a schematic of the positional relation of a plurality of electrode groups when acquiring the first data and the second data in the procedure of the second processing of the coordinate calculation according to a modification of the first embodiment. FIG. 21 is a schematic of the positional relation of a plurality of electrode groups when acquiring the first data and the second data in the procedure of the third processing of the coordinate calculation according to a modification of the first embodiment.

In the coordinate calculation according to the first embodiment described above, the first data and the second data are acquired using the detection values of the adjacent electrodes 12 when the maximum detection value Smax is equal to or smaller than the first threshold Sth1. Alternatively, the electrodes 12 to acquire the first data and the second data may be separated from each other as illustrated in FIG. 19.

In the coordinate calculation according to the first embodiment described above, the first data and the second data are acquired using the composite detection values of the adjacent electrode groups when the maximum detection value Smax exceeds the first threshold Sth1 and is equal to or smaller than the second threshold Sth2 larger than the first threshold Sth1. Alternatively, the electrode groups to acquire the first data and the second data may be separated from each other as illustrated in FIG. 20.

In the coordinate calculation according to the first embodiment described above, the first data and the second data are acquired using the composite detection values of the adjacent electrode groups when the maximum detection value Smax exceeds the second threshold Sth2. Alternatively, the electrode groups to acquire the first data and the second data may be separated from each other as illustrated in FIG. 21.

Second Embodiment

The first embodiment has described the example where the first processing, the second processing, and the third processing are switched depending on the magnitude of the maximum detection value Smax. In this case, however, it is conceivable that the acquired coordinates may possibly be misaligned before and after the switching between the first processing and the second processing or between the second processing and the third processing.

A second embodiment describes an example where the first processing, the second processing, and the third processing are performed independently of the magnitude of the maximum detection value Smax, and the data calculated by the first processing, the second processing, and the third processing are composited according to the magnitude of the maximum detection value Smax.

Figure 22:
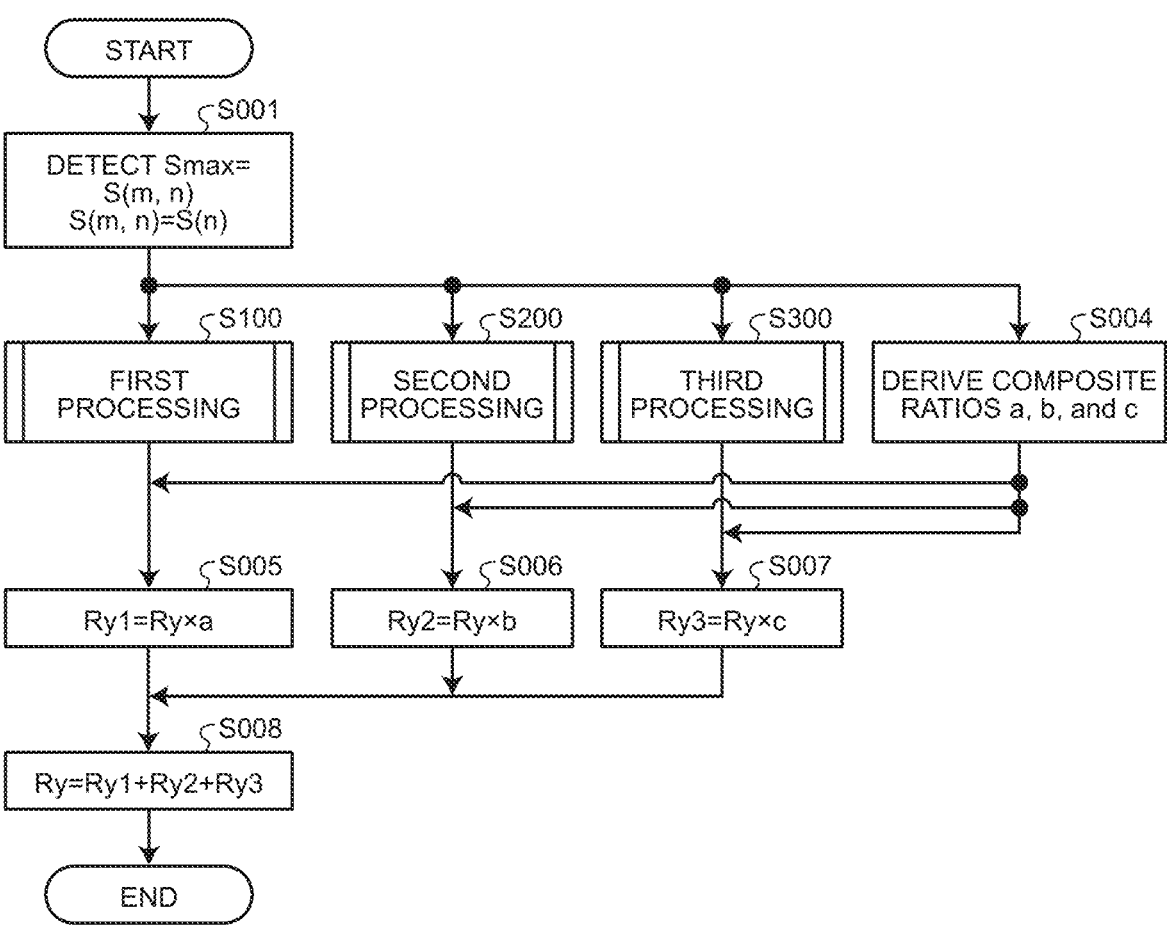
FIG. 22 is a flowchart of a specific example of the coordinate calculation according to a second embodiment.

FIG. 22 is a flowchart of a specific example of the coordinate calculation according to the second embodiment. In the coordinate calculation according to the second embodiment, the coordinate calculator 45 extracts the electrode 12 with the largest detection value S(m, n) and detects the detection value S(m, n) of the extracted electrode 12 as the maximum detection value Smax (Step S001). The detection value S(m, n) of the electrode 12 in the m-th column and the n-th row detected as the maximum detection value Smax is represented by "S(n)".

The coordinate calculator 45 performs the first processing (Step S100), the second processing (Step S200), and the third processing (Step S300) to calculate the data Ry indicating the position of the object to be detected F in the short side direction (second direction) on or above the detection region AA. Detailed explanation of the first processing, the second processing, and the third processing according to the second embodiment is omitted herein because they are the same as those according to the first embodiment.

Figure 23A:
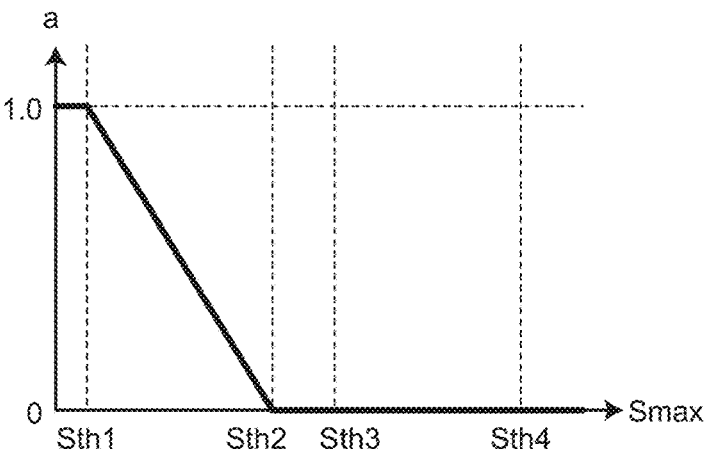
FIG. 23A is a graph illustrating an example of a first data ratio table.
Figure 23B:
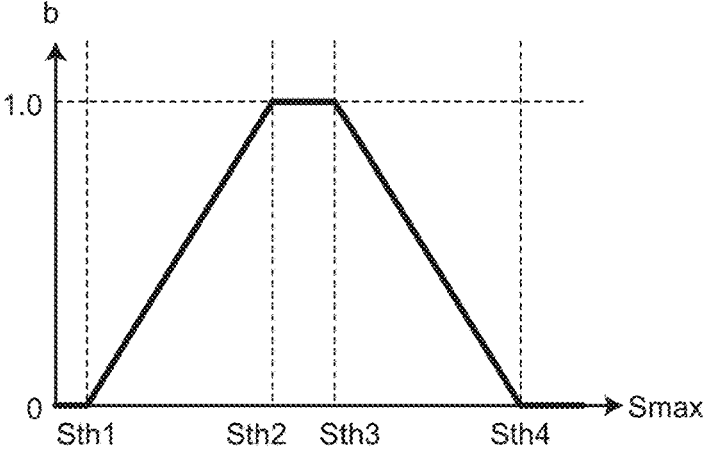
FIG. 23B is a graph illustrating an example of a second data ratio table.
Figure 23C:
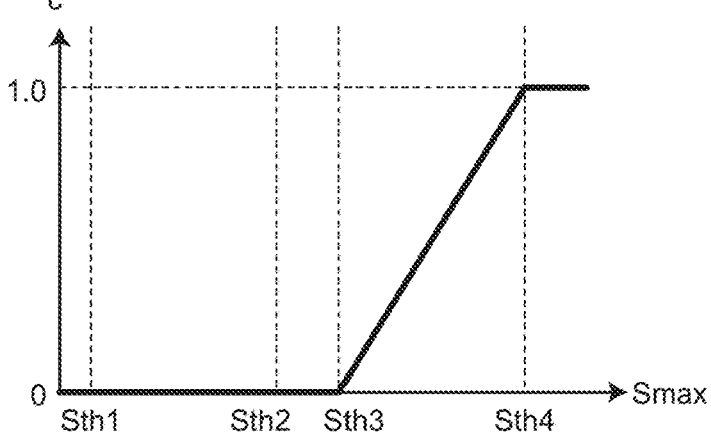
FIG. 23C is a graph illustrating an example of a third data ratio table.

The coordinate calculator 45 derives composite ratios "a", "b", and "c" to be used for calculating the data Ry indicating the position of the object to be detected F in the short side direction (second direction) on or above the detection region AA (Step S004). FIG. 23A is a graph illustrating an example of a first data ratio table. FIG. 23B is a graph illustrating an example of a second data ratio table. FIG. 23C is a graph illustrating an example of a third data ratio table. The data ratio tables illustrated in FIGS. 23A, 23B, and 23C may be, for example, in a form where the composite ratios "a", "b", and "c" are set corresponding to the maximum detection value Smax or in a form where a relational expression between the maximum detection value Smax and the composite ratios "a", "b", "c" is set. The data ratio tables are stored in the storage 46 provided in the processing circuit 23, for example.

Specifically, the coordinate calculator 45 derives the composite ratio "a" of the data Ry obtained as the first processing result using the first data ratio table illustrated in FIG. 23A and multiplies the data Ry obtained as the first processing result by the composite ratio "a" to calculate first data Ry1 (Step S005).

The coordinate calculator 45 derives the composite ratio "b" of the data Ry obtained as the second processing result using the second data ratio table illustrated in FIG. 23B and multiplies the data Ry obtained as the second processing result by the composite ratio "b" to calculate second data Ry2 (Step S006).

The coordinate calculator 45 derives the composite ratio "c" of the data Ry obtained as the third processing result using the third data ratio table illustrated in FIG. 23C and multiplies the data Ry obtained as the third processing result by the composite ratio "c" to calculate third data Ry3 (Step S007).

The first data Ry1 and the second data Ry2 at Step S005 and Step S006 are different from the first data Ry1 and the second data Ry2 in the internal processing of the first processing, the second processing, and the third processing.

Subsequently, the coordinate calculator 45 calculates the data Ry indicating the position of the object to be detected F in the short side direction (second direction) on or above the detection region AA using the following Expression (3) (Step S008).

$$Ry = Ry1 + Ry2 + Ry3 \qquad (3)$$

In the example illustrated in FIGS. 23A, 23B, and 23C, the ratio of the first processing result (composite ratio "a") to the data Ry is 100% in a first range equal to or smaller than a first threshold Sth1. In a second range exceeding the first threshold Sth1 and equal to or smaller than a second threshold Sth2 larger than the first threshold Sth1, the ratio of the first processing result (composite ratio "a") gradually decreases, and the ratio of the second processing result (composite ratio "b") gradually increases as the ratio of the first processing result (composite ratio "a") decreases. The relation between the composite ratio "a" and the composite ratio "b" in the second range is expressed by the following Expression (4).

$$b = 1 - a \qquad (4)$$

The first threshold Sth1 and the second threshold Sth2 in FIGS. 23A, 23B, and 23C are different from the first threshold Sth1 and the second threshold Sth2 set as the thresholds for the maximum detection value Smax according to the first embodiment.

In the example illustrated in FIGS. 23A, 23B, and 23C, the ratio of the second processing result (composite ratio "b") to the data Ry is 100% in a third range exceeding the second threshold Sth2 and equal to or smaller than a third threshold Sth3 larger than the second threshold Sth2. In a fourth range exceeding the third threshold Sth3 and equal to or smaller than a fourth threshold Sth4 larger than the third threshold Sth3, the ratio of the second processing result (composite ratio "b") gradually decreases, and the ratio of the third processing result (composite ratio "c") gradually increases as the ratio of the second processing result (composite ratio "b") decreases. The relation between the composite ratio "b" and the composite ratio "c" in the fourth range is expressed by the following Expression (5). In a fifth range exceeding the fourth threshold Sth4, the ratio of the third processing result (composite ratio "c") to the data Ry is 100%.

$$c = 1 - b \qquad (5)$$

This configuration can prevent the data Ry indicating the position of the object to be detected F in the short side direction (second direction) on or above the detection region AA from significantly changing when the maximum detection value Smax transitions between the ranges.

As described above, in the coordinate calculation according to the second embodiment, the data Ry indicating the position of the object to be detected F in the short side direction (second direction) on or above the detection region AA is calculated by compositing the first processing result, the second processing result, and the third processing result in a ratio corresponding to the magnitude of the maximum detection value Smax. This can enhance the coordinate acquisition accuracy independently of the magnitude of the maximum detection value Smax.

The second embodiment has described the example where the first processing, the second processing, and the third processing are performed independently of the magnitude of the maximum detection value Smax. Alternatively, the third processing may not be performed in the first range and the second range in which the maximum detection value Smax is equal to or smaller than the second threshold Sth2, for example. The first processing may not be performed in the fourth range and the fifth range in which the maximum detection value Smax exceeds the third threshold Sth3, for example. Neither the first processing nor the second processing may be performed in the fifth range in which the maximum detection value Smax clearly exceeds the fourth threshold Sth4.

While exemplary embodiments according to the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure.

What is claimed is:

1. A detection device comprising:
a detection region provided with a plurality of electrodes arranged in a first direction and a second direction different from the first direction;
a signal processor configured to generate a detection value for each of the electrodes; and
a coordinate calculator configured to calculate data indicating a position of an object to be detected in the second direction on or above the detection region based on the detection values of the electrodes arrayed in the second direction, wherein the shape of the electrodes is rectangular with a width in the second direction smaller than a width in the first direction, and
the coordinate calculator extracts an electrode the detection value of which is the largest, determines the detection value of the extracted electrode to be the maximum detection value, calculates the data using the detection values of at least three electrodes including the electrode extracted as the maximum detection value, and changes the number of electrodes used to calculate the data depending on a magnitude of the maximum detection value.

2. The detection device according to claim 1, wherein
the coordinate calculator calculates the data using the detection values of three electrodes when the maximum detection value is equal to or smaller than a predetermined threshold, and
the coordinate calculator derives a composite detection value of the detection values of a plurality of electrodes arrayed in the second direction and calculates the data using three composite detection values when the maximum detection value exceeds the threshold.

3. The detection device according to claim 1, wherein
a first threshold and a second threshold larger than the first threshold are set as thresholds for the maximum detection value,
the coordinate calculator
calculates the data using the detection values of three electrodes when the maximum detection value is equal to or smaller than the first threshold,
derives a composite detection value of the detection values of two electrodes arrayed in the second direction and calculates the data using three composite detection values when the maximum detection value exceeds the first threshold and is equal to or smaller than the second threshold, and
derives a composite detection value of the detection values of three electrodes arrayed in the second direction and calculates the data using three composite detection values when the maximum detection value exceeds the second threshold.

4. The detection device according to claim 1, wherein the coordinate calculator calculates the data by compositing:
a result of calculation using the detection values of three electrodes;
a result of calculation using three composite detection values each derived by compositing the detection values of two electrodes arrayed in the second direction; and
a result of calculation using three composite detection values in a ratio corresponding to the magnitude of the maximum detection value, the three composite detection values each derived by compositing the detection values of three electrodes arrayed in the second direction.

5. The detection device according to claim 1, comprising:
a sensor substrate provided with the electrodes; and
a cover glass overlapping the sensor substrate with an adhesive layer interposed therebetween, wherein the cover glass and the sensor substrate are stacked in a third direction orthogonal to the first direction and the second direction.

6. A detection system comprising:
a detection device according to claim 5; and
a display panel disposed facing the sensor substrate with an air gap interposed therebetween, wherein the detection region and a display region of the display panel overlap in plan view when viewed in the third direction.

\* \* \* \* \*